(12) United States Patent
Thibadeau, Sr. et al.

(10) Patent No.: US 10,659,465 B2
(45) Date of Patent: May 19, 2020

(54) ADVANCED PROOFS OF KNOWLEDGE FOR THE WEB

(71) Applicants: Robert H. Thibadeau, Sr., Pittsburgh, PA (US); Justin D. Donnell, Verona, PA (US); Robert Thibadeau, Jr., Decatur, GA (US)

(72) Inventors: Robert H. Thibadeau, Sr., Pittsburgh, PA (US); Justin D. Donnell, Verona, PA (US); Robert Thibadeau, Jr., Decatur, GA (US)

(73) Assignee: Antique Books, Inc., Pittsburgh, PA (US)

( * ) Notice: Subject to any disclaimer, the term of this patent is extended or adjusted under 35 U.S.C. 154(b) by 109 days.

(21) Appl. No.: 16/036,525

(22) Filed: Jul. 16, 2018

(65) Prior Publication Data

US 2018/0343255 A1    Nov. 29, 2018

Related U.S. Application Data

(63) Continuation of application No. 14/728,759, filed on Jun. 2, 2015, now abandoned.
(Continued)

(51) Int. Cl.
*H04L 29/06* (2006.01)
*G06F 21/36* (2013.01)
(Continued)

(52) U.S. Cl.
CPC .......... *H04L 63/0884* (2013.01); *G06F 21/31* (2013.01); *G06F 21/36* (2013.01);
(Continued)

(58) Field of Classification Search
CPC ................................................. H04L 63/0884
(Continued)

(56) References Cited

U.S. PATENT DOCUMENTS

| 5,559,961 A | 9/1996 | Blonder |
| 5,931,948 A | 8/1999 | Morisawa et al. |

(Continued)

FOREIGN PATENT DOCUMENTS

| EP | 1601153 A2 | 11/2005 |
| EP | 2085908 A2 | 8/2009 |

(Continued)

OTHER PUBLICATIONS

Examination Report for European Patent Application No. 15729691. 4, dated Sep. 13, 2018, 5 pages.
(Continued)

*Primary Examiner* — Peter C Shaw
(74) *Attorney, Agent, or Firm* — Withrow & Terranova, PLLC

(57) ABSTRACT

Embodiments described herein relate to a server computer operable to provide a proof of knowledge service. In some embodiments, the server computer includes processor(s) and memory containing instructions executable by the processor (s) such that the server computer is operable to authenticate a user on behalf of a relying party server. The server computer is further operable to obtain results of one or more tests from a client device of the user. The server computer is further operable to send one or more instructions to the relying party server in accordance with the results of the one or more tests, where the one or more instructions have been predefined by the user and define one or more actions to be taken by the relying party server in an event where the user does not pass the one or more tests.

19 Claims, 20 Drawing Sheets

Related U.S. Application Data

(60) Provisional application No. 62/006,472, filed on Jun. 2, 2014.

(51) Int. Cl.
  *H04W 12/06* (2009.01)
  *G06F 21/31* (2013.01)

(52) U.S. Cl.
  CPC .......... *H04L 63/0892* (2013.01); *H04L 63/10* (2013.01); *H04W 12/06* (2013.01)

(58) Field of Classification Search
  USPC .......................................................... 726/7
  See application file for complete search history.

(56) References Cited

U.S. PATENT DOCUMENTS

| | | |
|---|---|---|
| 6,209,104 B1 | 3/2001 | Jalili |
| 6,249,868 B1 | 6/2001 | Sherman et al. |
| 6,411,283 B1 | 6/2002 | Murphy |
| 6,658,328 B1 | 12/2003 | Alrabady et al. |
| 6,934,860 B1 | 8/2005 | Goldstein |
| 6,983,065 B1 | 1/2006 | Akgul et al. |
| 7,243,239 B2 | 7/2007 | Kirovski et al. |
| 7,370,351 B1* | 5/2008 | Ramachandran ....... H04L 63/08 726/4 |
| 7,734,930 B2 | 6/2010 | Kirovski et al. |
| 8,015,563 B2 | 9/2011 | Araujo, Jr. et al. |
| 8,024,775 B2 | 9/2011 | Xu et al. |
| 8,132,017 B1 | 3/2012 | Lewis |
| 8,155,622 B1 | 4/2012 | Moshenberg et al. |
| 8,191,126 B2 | 5/2012 | Raghavan |
| 8,353,016 B1 | 1/2013 | Pravetz et al. |
| 8,392,975 B1 | 3/2013 | Raghunath |
| 8,627,421 B1 | 1/2014 | Bowers et al. |
| 8,667,560 B2 | 3/2014 | Albisu |
| 8,682,802 B1 | 3/2014 | Kannanari |
| 8,813,183 B2 | 8/2014 | Thibadeau et al. |
| 8,813,247 B1 | 8/2014 | Alten |
| 8,832,804 B1 | 9/2014 | Casey et al. |
| 8,881,251 B1 | 11/2014 | Hilger |
| 8,918,851 B1 | 12/2014 | Iannamico |
| 8,966,268 B2 | 2/2015 | Marien |
| 9,300,659 B2 | 3/2016 | Thibadeau, Sr. et al. |
| 9,323,435 B2 | 4/2016 | Thibadeau, Sr. et al. |
| 9,490,981 B2 | 11/2016 | Thibadeau, Sr. et al. |
| 9,497,186 B2 | 11/2016 | Thibadeau, Sr. et al. |
| 9,582,106 B2 | 2/2017 | Thibadeau, Sr. et al. |
| 9,600,643 B2 | 3/2017 | Strode |
| 2002/0029341 A1 | 3/2002 | Juels et al. |
| 2002/0080123 A1 | 6/2002 | Kennedy et al. |
| 2002/0196274 A1 | 12/2002 | Comfort et al. |
| 2003/0147536 A1 | 8/2003 | Andivahis et al. |
| 2004/0010721 A1 | 1/2004 | Kirovski et al. |
| 2004/0030934 A1 | 2/2004 | Mizoguchi et al. |
| 2004/0034801 A1 | 2/2004 | Jaeger |
| 2004/0049697 A1 | 3/2004 | Edwards, Jr. et al. |
| 2004/0073809 A1 | 4/2004 | Wing Keong |
| 2004/0095384 A1 | 5/2004 | Avni et al. |
| 2004/0230843 A1 | 11/2004 | Jansen |
| 2005/0119979 A1 | 6/2005 | Murashita et al. |
| 2006/0206717 A1 | 9/2006 | Holt et al. |
| 2006/0244735 A1 | 11/2006 | Wilson |
| 2007/0005962 A1 | 1/2007 | Baker |
| 2007/0022299 A1 | 1/2007 | Yoshimura |
| 2007/0067631 A1 | 3/2007 | Westhoff |
| 2007/0097096 A1 | 5/2007 | Rosenberg |
| 2007/0150842 A1 | 6/2007 | Chaudhri et al. |
| 2007/0229216 A1 | 10/2007 | Yasuda |
| 2008/0010678 A1* | 1/2008 | Burdette ............ G06Q 30/0603 726/15 |
| 2008/0022129 A1 | 1/2008 | Durham et al. |
| 2008/0163055 A1 | 7/2008 | Ganz et al. |
| 2008/0201578 A1 | 8/2008 | Drake |
| 2008/0263361 A1 | 10/2008 | Dutta et al. |
| 2009/0089869 A1 | 4/2009 | Varghese |
| 2009/0106134 A1 | 4/2009 | Royyuru |
| 2009/0158424 A1 | 6/2009 | Yang |
| 2009/0160800 A1 | 6/2009 | Liu et al. |
| 2009/0199002 A1 | 8/2009 | Erickson |
| 2009/0202153 A1 | 8/2009 | Cortopassi et al. |
| 2009/0313693 A1 | 12/2009 | Rogers |
| 2010/0023756 A1 | 1/2010 | Ben-Itzhak et al. |
| 2010/0043062 A1 | 2/2010 | Alexander et al. |
| 2010/0146128 A1 | 6/2010 | Kulkarni et al. |
| 2010/0169958 A1 | 7/2010 | Werner et al. |
| 2010/0207721 A1 | 8/2010 | Nakajima et al. |
| 2010/0223326 A1 | 9/2010 | Noldus et al. |
| 2011/0013031 A1 | 1/2011 | Miyasako |
| 2011/0055585 A1 | 3/2011 | Lee |
| 2011/0078775 A1 | 3/2011 | Yan |
| 2011/0081640 A1* | 4/2011 | Tseng ..................... G06F 21/36 434/362 |
| 2011/0099203 A1 | 4/2011 | Fastring |
| 2011/0162067 A1 | 6/2011 | Shuart et al. |
| 2011/0191592 A1 | 8/2011 | Goertzen |
| 2011/0197259 A1 | 8/2011 | Thibadeau et al. |
| 2011/0202982 A1 | 8/2011 | Alexander et al. |
| 2012/0005483 A1 | 1/2012 | Patvarczki et al. |
| 2012/0011564 A1 | 1/2012 | Osborn et al. |
| 2012/0054833 A1 | 3/2012 | Albisu |
| 2012/0060028 A1 | 3/2012 | Furukawa |
| 2012/0084869 A1 | 4/2012 | Bilaney et al. |
| 2012/0096077 A1 | 4/2012 | Weerts et al. |
| 2012/0167199 A1 | 6/2012 | Riddiford |
| 2012/0175412 A1 | 7/2012 | Grabiner et al. |
| 2012/0260329 A1 | 10/2012 | Suffling |
| 2012/0304284 A1 | 11/2012 | Johnson et al. |
| 2013/0019090 A1 | 1/2013 | Wicker |
| 2013/0031623 A1 | 1/2013 | Sanders |
| 2013/0042303 A1 | 2/2013 | Chow et al. |
| 2013/0043914 A1 | 2/2013 | Gelman |
| 2013/0047236 A1 | 2/2013 | Singh |
| 2013/0097697 A1 | 4/2013 | Zhu et al. |
| 2013/0104197 A1 | 4/2013 | Nandakumar |
| 2013/0111581 A1 | 5/2013 | Griffin et al. |
| 2013/0179954 A1 | 7/2013 | Bidare |
| 2013/0201106 A1 | 8/2013 | Naccache |
| 2013/0268775 A1 | 10/2013 | Hawkins |
| 2013/0340057 A1 | 12/2013 | Kitlyar |
| 2014/0006512 A1 | 1/2014 | Huang et al. |
| 2014/0023279 A1 | 1/2014 | Fahn et al. |
| 2014/0028554 A1 | 1/2014 | De Los Reyes et al. |
| 2014/0181956 A1 | 6/2014 | Ahn et al. |
| 2014/0201831 A1 | 7/2014 | Yi et al. |
| 2014/0233740 A1 | 8/2014 | Niamut et al. |
| 2014/0282961 A1 | 9/2014 | Dorfman et al. |
| 2014/0320420 A1 | 10/2014 | Ida et al. |
| 2014/0331057 A1 | 11/2014 | Thibadeau et al. |
| 2014/0359653 A1 | 12/2014 | Thorpe et al. |
| 2014/0373132 A1 | 12/2014 | Basmov et al. |
| 2014/0380431 A1 | 12/2014 | Alonso Cebrian et al. |
| 2015/0033306 A1 | 1/2015 | Dickenson et al. |
| 2015/0135305 A1 | 5/2015 | Cabrera et al. |
| 2015/0138584 A1 | 5/2015 | Tsongas et al. |
| 2015/0180902 A1 | 6/2015 | Biswas et al. |
| 2015/0301724 A1 | 10/2015 | Thibadeau, Sr. et al. |
| 2015/0304303 A1 | 10/2015 | Thibadeau, Sr. et al. |
| 2015/0310188 A1 | 10/2015 | Ford et al. |
| 2015/0324609 A1 | 11/2015 | Grubel et al. |
| 2015/0349957 A1 | 12/2015 | Thibadeau, Sr. et al. |
| 2015/0350106 A1 | 12/2015 | Whalley et al. |
| 2015/0350204 A1 | 12/2015 | Wang et al. |
| 2015/0350210 A1 | 12/2015 | Thibadeau, Sr. et al. |
| 2016/0044021 A1 | 2/2016 | Thibadeau, Sr. et al. |
| 2016/0050198 A1 | 2/2016 | Thibadeau, Sr. et al. |
| 2016/0195995 A1 | 7/2016 | Thibadeau, Sr. et al. |

(56) References Cited

U.S. PATENT DOCUMENTS

2016/0232336 A1     8/2016   Pitschel et al.
2017/0223533 A1     8/2017   Wolman et al.

FOREIGN PATENT DOCUMENTS

| | | |
|---|---|---|
| EP | 2775416 A2 | 9/2014 |
| GB | 2504746 A | 2/2014 |
| RU | 2013113592 A | 10/2014 |
| WO | 03048909 A2 | 6/2003 |
| WO | 2005071518 A1 | 8/2005 |
| WO | 2009039223 A1 | 3/2009 |
| WO | 2011014878 A1 | 2/2011 |
| WO | 2011100017 A1 | 8/2011 |
| WO | 2013003535 A1 | 1/2013 |
| WO | 2014165431 A1 | 10/2014 |

OTHER PUBLICATIONS

Non-Final Office Action for U.S. Appl. No. 14/693,121, dated Aug. 6, 2015, 16 pages.
Non-Final Office Action for U.S. Appl. No. 14/728,902, dated Aug. 26, 2015, 15 pages.
Invitation to Pay Additional Fees and Partial International Search Report for PCT/US2015/033823, dated Aug. 14, 2015, 7 pages.
International Search Report and Written Opinion for PCT/US2015/033830, dated Aug. 24, 2015, 11 pages.
Non-Final Office Action for U.S. Appl. No. 14/330,986, dated Sep. 15, 2015, 16 pages.
Non-Final Office Action for U.S. Appl. No. 14/728,759, dated Sep. 10, 2015, 15 pages.
International Search Report and Written Opinion for PCT/US2015/033811, dated Sep. 21, 2015, 10 pages.
International Search Report and Written Opinion for PCT/US2015/044694, dated Oct. 2, 2015, 10 pages.
Author Unknown, "Cognitive test," Wikipedia.com, last modified Oct. 28, 2014, retrieved on Nov. 11, 2015, 3 pages, https://en.wikipedia.org/w/index.php?title=Cognitive_test&oldid=631463869.
Author Unknown, "James McKeen Cattell," Wikipedia.com, last modified Sep. 9, 2015, retrieved on Nov. 11, 2015, 5 pages, https://en.wikipedia.org/wiki/James_McKeen_Cattell.
International Search Report and Written Opinion for PCT/US2015/027040, dated Nov. 20, 2015, 21 pages.
International Search Report and Written Opinion for PCT/US2015/033823, dated Dec. 2, 2015, 18 pages.
Final Office Action for U.S. Appl. No. 14/330,986, dated Feb. 4, 2016, 18 pages.
Advisory Action for U.S. Appl. No. 14/330,986, dated May 2, 2016, 3 pages.
Notice of Allowance for U.S. Appl. No. 14/693,121, dated Jan. 22, 2016, 7 pages.
Final Office Action for U.S. Appl. No. 14/728,902, dated Jan. 29, 2016, 6 pages.
Notice of Allowance for U.S. Appl. No. 14/728,902, dated Mar. 11, 2016, 7 pages.
Non-Final Office Action for U.S. Appl. No. 14/728,904, dated Jan. 25, 2016, 15 pages.
Final Office Action for U.S. Appl. No. 14/728,759, dated Feb. 1, 2016, 17 pages.
Non-Final Office Action for U.S. Appl. No. 14/823,739, dated Nov. 30, 2015, 17 pages.
Final Office Action for U.S. Appl. No. 14/823,739, dated Apr. 28, 2016, 10 pages.
Menezes, A. et al., "Identification and Entity Authentication," Handbook of Applied Cryptography, CRC Press, 1997, pp. 385-424.
International Preliminary Report on Patentability for PCT/US2015/027040, dated Nov. 3, 2016, 15 pages.
International Preliminary Report on Patentability for PCT/US2015/033823, dated Nov. 3, 2016, 12 pages.
International Search Report and Written Opinion for PCT/US2016/020670, dated May 12, 2016, 11 pages.
International Search Report and Written Opinion for PCT/US2016/033793, dated Jul. 22, 2016, 11 pages.
Examination Report for European Patent Application No. 10845949.6, dated Jun. 13, 2016, 6 pages.
Examiner's Answer to the Appeal Brief for U.S. Appl. No. 14/330,986, dated Dec. 7, 2016, 21 pages.
Non-Final Office Action for U.S. Appl. No. 15/069,635, dated Jun. 16, 2016, 6 pages.
Notice of Allowance for U.S. Appl. No. 15/069,635, dated Oct. 18, 2016, 7 pages.
Notice of Allowance for U.S. Appl. No. 14/728,904, dated Jul. 1, 2016, 12 pages.
Corrected Notice of Allowability for U.S. Appl. No. 14/728,904, dated Aug. 10, 2016, 9 pages.
Corrected Notice of Allowability for U.S. Appl. No. 14/728,904, dated Oct. 13, 2016, 9 pages.
Non-Final Office Action for U.S. Appl. No. 14/728,759, dated Jul. 26, 2016, 16 pages.
Notice of Allowance for U.S. Appl. No. 14/823,739, dated Jul. 12, 2016, 8 pages.
International Preliminary Report on Patentability for PCT/US2015/033830, dated Dec. 15, 2016, 8 pages.
International Preliminary Report on Patentability for PCT/US2015/033811, dated Dec. 15, 2016, 7 pages.
International Preliminary Report on Patentability for PCT/US2015/044694, dated Feb. 23, 2017, 8 pages.
Final Office Action for U.S. Appl. No. 14/728,759, dated Feb. 15, 2017, 18 pages.
Second Written Opinion for PCT/US2016/033793, dated Apr. 4, 2017, 5 pages.
International Preliminary Report on Patentability for PCT/US2016/033793, dated Jun. 27, 2017, 6 pages.
Non-Final Office Action for U.S. Appl. No. 14/782,257, dated Mar. 9, 2017, 6 pages.
Non-Final Office Action for U.S. Appl. No. 15/409,045, dated Apr. 19, 2017, 8 pages.
Non-Final Office Action for U.S. Appl. No. 15/295,718, dated Mar. 9, 2017, 14 pages.
Notice of Allowance and Examiner-Initiated Interview Summary for U.S. Appl. No. 15/295,718, dated Aug. 14, 2017, 16 pages.
Non-Final Office Action for U.S. Appl. No. 14/728,759, dated Aug. 3, 2017, 19 pages.
Non-Final Office Action for U.S. Appl. No. 15/295,701, dated Apr. 28, 2017, 6 pages.
International Preliminary Report on Patentability for PCT/US2016/020670, dated Sep. 14, 2017, 7 pages.
Notice of Allowance for U.S. Appl. No. 15/409,045, dated Nov. 1, 2017, 7 pages.
Notice of Allowance for U.S. Appl. No. 15/295,701, dated Sep. 25, 2017, 7 pages.
Supplemental Notice of Allowability for U.S. Appl. No. 15/295,718, dated Dec. 8, 2017, 12 pages.
Final Office Action for U.S. Appl. No. 14/728,759, dated Mar. 15, 2018, 19 pages.
Examination Report for European Patent Application No. 15721438.8, dated Jul. 17, 2018, 7 pages.
Examination Report for European Patent Application No. 16710889.3, dated Aug. 19, 2019, 4 pages.
Non-Final Office Action for U.S. Appl. No. 15/554,782, dated Sep. 18, 2019, 16 pages.
Non-Final Office Action for U.S. Appl. No. 15/575,648, dated Aug. 12, 2019, 17 pages.
Author Unknown, "Human Verification," retrieved on Apr. 22, 2015 from graphicdesign.stackexchange.com, 1 page.
Author Unknown, "OpenID Authentication 2.0—Final," Openid.net, Dec. 5, 2007, retrieved on Jan. 1, 2013 from http://openid.net/specs/openid-authentication-2_0.html#http_encoding, 34 pages.
Author Unknown, "Security Assertion Markup Language (SAML) V2.0 Technical Overview," OASIS, Mar. 25, 2008, retrieved on Apr. 14, 2010 from http://docs.oasis-open.org/security/saml/Post2.0/sstc-saml-tech-overview-2.0-cd-02.pdf, 51 pages.

(56) References Cited

OTHER PUBLICATIONS

Beideman, Calvin et al., "Set Families with Low Pairwise Intersection," Apr. 17, 2014, retrieved Jan. 15, 2015 from http://www.cs.cmu.edu/~jblocki/, 12 pages.
Blocki, Jeremiah et al., "Adaptive Regret Minimization in Bounded-Memory Games," Decision and Game Theory for Security: Proceedings of the 4th International Conference on Decision and Game Theory for Security (GameSec), Nov. 11-12, 2013, Fort Worth, TX, Springer International Publishing, pp. 65-84, retrieved Jan. 15, 2015 from http://www.cs.cmu.edu/~jblocki/, 19 pages.
Blocki, Jeremiah et al., "Adaptive Regret Minimization in Bounded-Memory Games," Presentation Slides, retrieved Jan. 15, 2015 from http://www.cs.cmu.edu/~jblocki/, 61 pages.
Blocki, Jeremiah et al., "Audit Games," Proceedings of the 23rd International Joint Conference on Artificial Intelligence, Aug. 3-9, 2013, Beijing, China, AAAI Press, pp. 41-47.
Blocki, Jeremiah et al., "Audit Games with Multiple Defender Resources," retrieved Jan. 15, 2015 from http://www.cs.cmu.edu/~jblocki/, 11 pages.
Blocki, Jeremiah et al., "Audit Mechanisms for Provable Risk Management and Accountable Data Governance," Decision and Game Theory for Security: Proceedings of the 3rd International Conference on Decision and Game Theory for Security (GameSec), Budapest, Hungary, Nov. 5-6, 2012, Springer Berlin Heidelberg, pp. 38-59, retrieved Jan. 15, 2015 from http://www.cs.cmu.edu/~jblocki/, 27 pages.
Blocki, Jeremiah et al., "Audit Mechanisms for Privacy Protection in Healthcare Environments," Proceedings of the 2nd USENIX Conference on Health Security and Privacy (HealthSec'11), Aug. 8-12, 2011, San Francisco, CA, USENIX Association, p. 10, retrieved Jan. 15, 2015 from http://www.cs.cmu.edu/~jblocki/, 2 pages.
Blocki, Jeremiah et al., "Differentially Private Data Analysis of Social Networks via Restricted Sensitivity," Proceedings of the 4th Conference on Innovations in Theoretical Computer Science (ITCS '13), Jan. 10-12, 2013, Berkely, CA, ACM, pp. 87-96, retrieved Jan. 15, 2015 from http://arxiv.org/abs/1208.4586v2, 19 pages.
Blocki, Jeremiah et al., "Differentially Private Data Analysis of Social Networks via Restricted Sensitivity," Presentation Slides, Fall 2012, retrieved Jan. 15, 2015 from http://www.cs.cmu.edu/~jblocki/, 94 pages.
Blocki, Jeremiah, "Senior Research Thesis: Direct Zero-Knowledge Proofs," May 1, 2009, retrieved Jan. 15, 2015 from http://www.cs.cmu.edu/~jblocki/, 16 pages.
Blocki, Jeremiah et al., "Gotcha Password Hackers!" Proceedings of the 2013 ACM Workshop on Artificial Intelligence and Security (AISec '13), Nov. 4-8, 2013, Berlin, Germany, ACM, 12 pages.
Blocki, Jeremiah et al., "Gotcha Password Hackers!" Presentation Slides, retrieved Jan. 15, 2015 from http://www.cs.cmu.edu/~jblocki/, 38 pages.
Blocki, Jeremiah et al., "Human Computable Passwords," Oct. 2, 2014, retrieved Jan. 15, 2015 from http://www.cs.cmu.edu/~jblocki/, 43 pages.
Blocki, Jeremiah et al., "Human Computable Passwords," Presentation Slides, Fall 2014, retrieved Jan. 15, 2015 from http://www.cs.cmu.edu/~jblocki/, 111 pages.
Blocki, Jeremiah et al., "The Johnson-Lindenstrauss Transform Itself Preserves Differential Privacy," Proceedings of the 2012 IEEE 53rd Annual Symposium on Foundations of Computer Science (FOCS), Oct. 20-23, 2012, New Brunswick, NJ, IEEE Computer Society, pp. 410-419, retrieved Jan. 15, 2015 from http://www.cs.cmu.edu/~jblocki/, 27 pages.
Blocki, Jeremiah et al., "Naturally Rehearsing Passwords," Advances in Cryptology—ASIACRYPT 2013: Proceedings of the 19th International Conference on the Theory and Application of Cryptology and Information Security, Part II, Bengaluru, India, Dec. 1-5, 2013 Springer Berlin Heidelberg, pp. 361-380, retrieved Jan. 15, 2015 from http://www.cs.cmu.edu/~jblocki/, 34 pages.
Blocki, Jeremiah et al., "Optimizing Password Composition Policies," Proceedings of the 14th ACM Conference on Electronic Commerce, Jun. 16-20, 2013, Philadelphia, PA, ACM, pp. 105-122, retrieved Jan. 15, 2015 from http://www.cs.cmu.edu/~jblocki/, 27 pages.
Blocki, Jeremiah, "Usable and Secure Password Management," Presentation Slides, Spring 2012, retrieved Jan. 15, 2015 from http://www.cs.cmu.edu/~jblocki/, 75 pages.
Blocki, Jeremiah et al., "Regret Minimizing Audits: A Learning-theoretic Basis for Privacy Protection," 2011 IEEE 24th Computer Security Foundations Symposium (CSF), Jun. 27-29, 2011, Cernay-la-Ville, France, IEEE, pp. 312-327, retrieved Jan. 15, 2015 from http://www.cs.cmu.edu/~jblocki/, 16 pages.
Blocki, Jeremiah et al., "Resolving the Complexity of Some Data Privacy Problems," Automata, Languages and Programming: Proceedings of the 37th International Colloquium Conference on Automata, Languages and Programming (ICALP 2010), Jul. 6-10, 2010, Bordeaux, France, Springer Berlin Heidelberg, pp. 393-404, retrieved Jan. 15, 2015 from http://www.cs.cmu.edu/~jblocki/, 18 pages.
Blocki, Jeremiah et al., "Resolving the Complexity of Some Data Privacy Problems," Presentation Slides, 2010, retrieved Jan. 15, 2015 from http://www.cs.cmu.edu/~jblocki/, 36 pages.
Blocki, Jeremiah et al., "Spaced Repetition and Mnemonics Enable Recall of Multiple Strong Passwords," Oct. 6, 2014, retrieved Jan. 15, 2015 from http://www.cs.cmu.edu/~jblocki/, 16 pages.
Blocki, Jeremiah, "Usable Human Authentication: A Quantitative Treatment," Doctoral Thesis, Jun. 30, 2014, retrieved Jan. 15, 2015 from http://www.cs.cmu.edu/~jblocki/, 262 pages.
Dunphy, Paul et al., "Do Background Images Improve "Draw a Secret" Graphical Passwords?" Proceedings of the 14th ACM Conference on Computer and Communications Security (CCS '07), Oct. 29-Nov. 2, 2007, Alexandria, Virginia, ACM, pp. 36-47.
Hughes, Neil, "Future iPhones, iPads could recognize, adjust for individual users," AppleInsider, Aug. 19, 2010, 4 pages, http://appleinsider.com/articles/10/08/19/future_iphones_ipads_could_recognize_adjust_for_individual_users.
Jansen, Wayne et al., "Picture Password: A Visual Login Technique for Mobile Devices," National Institute of Standards and Technology, NISTIR 7030, Jul. 2003, 20 pages.
Pace, Zach, "Signing in with a picture password," http://blogs.msdn.com/b/b8/archive/2011/12/16/signing-in-with-a-picture-password.aspx, Dec. 16, 2011, 9 pages.
Scavo, T. et al., "Shibboleth Architecture," Jun. 8, 2005, retrieved on Jun. 20, 2014 from http:/open-systems.ufl.edu/files/draft-mace-shibboleth-tech-overview-latest.pdf, 31 pages.
Thibadeau, Robert et al., "Proofs of Knowledge on the Web: A New Framework for Password Identification and Capacity to Make Decisions," 2014-NIST-NSTIC-01 Abbreviated Proposal, Bright Plaza, Inc., Philadelphia, Mar. 2, 2014, 5 pages.
Zhao, Ziming et al., "On the Security of Picture Gesture Authentication," 22nd USENIX Security Symposium, Aug. 14-16, 2013, Washington, D.C., pp. 383-398.
International Search Report for PCT/US10/58825, dated Feb. 2, 2011, 2 pages.
Written Opinion of the International Searching Authority for PCT/US10/58825, dated Feb. 2, 2011, 4 pages.
International Preliminary Report on Patentability for PCT/US10/58825, dated May 23, 2012, 3 pages.
International Search Report and Written Opinion for PCT/US2014/032342, dated Jul. 4, 2014, 14 pages.
Written Opinion of the International Searching Authority for PCT/US2014/032342, dated Mar. 17, 2015, 6 pages.
International Preliminary Report on Patentability for PCT/US2014/032342, dated Jun. 24, 2015, 23 pages.
Extended European Search Report for European Patent Application No. 10845949.6, dated Oct. 9, 2014, 7 pages.
Non-Final Office Action for U.S. Appl. No. 12/884,478, dated Dec. 12, 2012, 15 pages.
Final Office Action for U.S. Appl. No. 12/884,478, dated May 20, 2013, 19 pages.
Advisory Action for U.S. Appl. No. 12/884,478, dated Sep. 9, 2013, 3 pages.
Notice of Allowance and Examiner-Initiated Interview Summary for U.S. Appl. No. 12/884,478, dated Apr. 4, 2014, 10 pages.

(56) References Cited

OTHER PUBLICATIONS

Non-Final Office Action for U.S. Appl. No. 14/330,986, dated Dec. 16, 2014, 18 pages.
Final Office Action for U.S. Appl. No. 14/330,986, dated Apr. 27, 2015, 20 pages.
Advisory Action and Examiner Initiated Interview for U.S. Appl. No. 14/330,986, dated Jul. 14, 2015, 3 pages.
Invitation to Pay Additional Fees and Partial International Search Report for PCT/US2015/027040, dated Jul. 24, 2015, 7 pages.
Decision on Appeal for U.S. Appl. No. 14/330,986, dated Mar. 27, 2018, 10 pages.
Supplemental Notice of Allowability for U.S. Appl. No. 15/295,718, dated Nov. 15, 2017, 12 pages.
Final Office Action for U.S. Appl. No. 15/575,648, dated Mar. 13, 2020, 18 pages.

\* cited by examiner

ADVANCED PROOFS OF KNOWLEDGE FOR THE WEB

RELATED APPLICATIONS

This application is a continuation of U.S. patent application Ser. No. 14/728,759, filed Jun. 2, 2015, which claims the benefit of provisional patent application Ser. No. 62/006,472, filed Jun. 2, 2014, the disclosures of which are hereby incorporated herein by reference in their entirety.

FIELD OF THE DISCLOSURE

The present disclosure relates generally to advanced proofs of knowledge and, more particularly, to mechanisms for providing access to services in accordance with advanced capability testing.

BACKGROUND

Authentication mechanisms use one or more authentication factors to control access to secured services. An authentication mechanism may require a knowledge factor (e.g., a username and a password), an ownership factor (e.g., a hardware security token), an inherence factor (e.g., a biometric identifier such as a fingerprint), or combinations thereof. The first of these is commonly referred to as proof of knowledge.

Authentication based on proof of knowledge includes a provisioning phase (e.g., enrollment) to define user knowledge, and a use phase to authenticate a user that proves that knowledge. Authentication based on conventional identity management techniques provides access control to secured services by validating a username and password to demonstrate proof of knowledge. Improved identity management techniques to authenticate a user employ picture passwords (rather than textual passwords) that prove that the user has knowledge of a combination of input actions together with a known image (such as, for example, a still picture, a motion picture with or without sound, a photograph). Although using a picture password increases security due to the increased complexity of the proof of knowledge, access control for authenticated users remains unchanged in existing systems.

Online portals such as websites use the aforementioned rigid identity management techniques as proof of knowledge to control access to private information such as a bank account, a brokerage account, electronic billing, or a payment system. A relying party such as a bank providing the bank account, a brokerage firm providing the brokerage account, or a proprietor of the electronic billing or payment system requires robust forms of proof of knowledge to maintain control over access to the private information.

The online portals may use additional mechanisms to distinguish between human and machine input. For example, mechanisms such as Completely Automated Public Turing test to tell Computers and Humans Apart (CAPTCHA) provide a type of challenge-response test to determine whether or not a user is a human, instead of, for example, a "robot" or other type of computer agent seeking to thwart an authentication mechanism.

Thus, conventional identity management techniques are used to control access to services by merely validating human input of a user's identity to demonstrate proof of knowledge. Although existing mechanisms can grant access to services based on whether a user's identity is valid, a need exists to improve access control to services without being constrained by the aforementioned rigid identity management techniques.

SUMMARY

Systems and methods disclosed herein relate to defining and using one or more tests during user authentication to determine whether action should be taken in accordance with one or more instructions for access control defined by the user. In some particular embodiments, the one or more tests relate to a mental capacity of the user, and the one or more instructions define action(s) to be taken if the user does not successfully complete the one or more tests (i.e., if the user is found to have diminished mental capacity as indicated by unsuccessful completion of the test(s)). The instructions may, in some embodiments, provide limited access to secured information of the user if the user does not successfully complete the test(s).

In some embodiments, a server computer is operable to authenticate a user on behalf of a relying party server. The server computer is further operable to obtain results of one or more tests from a client device of the user. The server computer is further operable to send one or more instructions to the relying party server in accordance with the results of the one or more tests, where the one or more instructions have been predefined and define one or more actions to be taken by the relying party server in an event where the user does not pass the one or more tests. In some embodiments, the one or more tests have been predefined by the user.

In some embodiments, the server computer is further operable to obtain information indicative of whether one or more conditions for activating the one or more tests are satisfied, and administer the one or more tests upon determining that the one or more conditions are satisfied. In some embodiments, the conditions have been predetermined by the user.

In some embodiments, for each of a set of tests, the server computer is further operable to obtain information indicative of whether the test is to be activated based on one or more conditions having been predetermined by the user. The server computer then administers the test upon determining that the test is to be activated or otherwise deactivates the test. In some embodiments, the one or more tests for which the results are obtained are one or more tests from the set of tests that are activated.

In some embodiments, the conditions comprise one or more from a group consisting of always activated, activated upon request, activated for predetermined dates or times, and activated based on a triggering event.

In some embodiments, the one or more instructions set rights for the user at the client device to a service provided by the relying party in accordance with one of read-only access, full access, and restricted access.

In some embodiments, in order to send the one or more instructions to the relying party server in accordance with the results of the one or more tests, the server computer is further operable to determine whether the user passed the one or more tests based on the input obtained from the client device, and upon determining that the user did not pass the one or more tests, send the one or more instructions to the relying party server.

In some embodiments, the results of the one or more tests are indicative of mental capacity of the user.

In some embodiments, the one or more actions defined by the one or more instructions comprise restricting access to services provided by the relying party server.

In some embodiments, for each of the one or more tests, the server computer is further operable to determine whether the one or more conditions for activating the test are satisfied. The server computer then activates the test upon determining that the one or more conditions are satisfied or otherwise deactivates the test.

In some embodiments, the server computer is further operable to receive a communication from the client device of the user which authorizes another user to modify at least one of the one or more tests and at least one of the one or more instructions.

In some embodiments, the server computer is further operable to receive a communication from the relying party server, the communication comprising encrypted data indicative of the one or more tests.

Embodiments are also directed to a relying party server comprising one or more processors and memory containing instructions executable by the one or more processors. The relying party server is operable to send a communication to a proof of knowledge server for authenticating a user on behalf of the relying party server, and receive one or more instructions from the proof of knowledge server in accordance with results of one or more tests. In some embodiments, the one or more instructions have been predefined and define one or more actions to be taken by the relying party in an event where the user does not pass the one or more tests. In some embodiments, the one or more tests have been predefined by the user.

In some embodiments, the one or more actions defined by the one or more instructions restrict access to services provided by the relying party server.

In some embodiments, the one or more tests are unknown to the relying party server.

In some embodiments, for each of a set of tests, the relying party server is further operable to determine whether the test is to be activated based on one or more conditions having been predetermined. The relying party server then activates the test upon determining that the test is to be activated or otherwise deactivates the test. In some embodiments, the one or more tests for which the results are obtained are one or more tests from the set of tests that are activated.

Embodiments are also directed to a client device comprising one or more processors and memory containing instructions executable by the one or more processors. The client device is operable to obtain one or more input actions for an image displayed at the client device and send a communication to a proof of knowledge server to authenticate a user on behalf of a relying party server based on the one more input actions. The client device is further operable to obtain one or more answers to one or more tests and send a communication to the proof of knowledge server to determine access to a service administered by the relying party server based on the one or more answers. The client device is further operable to obtain access to the service administered by the relying party server in accordance with one or more instructions provided by the proof of knowledge server. In some embodiments, the one or more instructions have been predefined and define one or more actions to be taken by the relying party server in an event where the user does not pass the one or more tests based on the one or more answers. In some embodiments, the one or more tests have been predefined by the user.

In some embodiments, the client device is further operable to access an interface administered by the relying party server for display at the client device, send a request to the relying party server to authenticate the user, and receive a communication from the proof of knowledge server that causes the client device to redirect communications from the relying party server to the proof of knowledge server. The client device is further operable to receive a communication from the proof of knowledge sever to enable user input of a proof of knowledge for user authentication, and obtain user input of the proof of knowledge. In some embodiments, the communication sent to the proof of knowledge server to authenticate the user on behalf of the relying party server comprises information that is indicative of the user input of the proof of knowledge.

In some embodiments, upon sending the communication to the proof of knowledge server indicative of the one or more answers, the client device is further operable to receive a communication from the proof of knowledge server that causes the client device to redirect communications from the proof of knowledge server to the relying party server.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
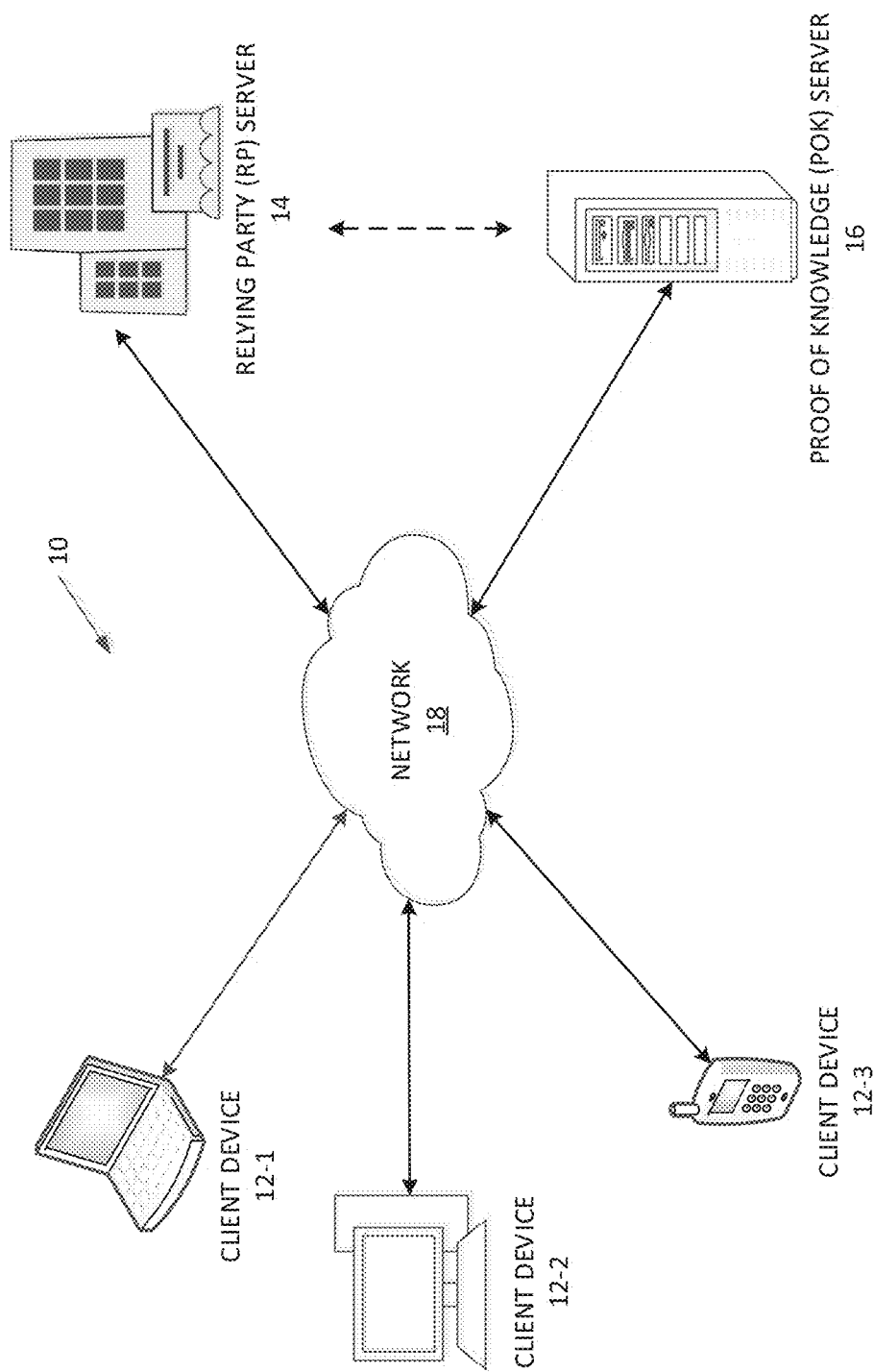
FIG. 1 illustrates an advanced proof of knowledge authentication system according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The purpose of terminology used herein is only for describing embodiments and is not intended to limit the disclosure.

As used herein, terms such as "first," "second," "third," and the like distinguish one element or embodiment from another but should not limit the element or embodiment. For example, an embodiment can be termed a first embodiment or a second embodiment without departing from the scope of the present disclosure.

As used herein, the term "client device" refers to a device or apparatus that includes hardware and/or software that provides a web browser, a client application operable to communicate using client-server architecture, and/or a client application for retrieving, presenting, and communicating information over the Internet.

As used herein, the term "Relying Party (RP) server" refers to a device or apparatus that provides one or more services accessible by a client device via a network portal (e.g., a website). The services may include actions and/or information administered by a RP server in accordance with access controls that require authentication of an identity of a user operating the client device.

As used herein, the term "Proof of Knowledge (PoK) server" refers to a device or apparatus that includes hardware and/or software to provide a service (e.g., a password service) used to authenticate the identity of a user on behalf of the RP server, where the user is operating a client device.

As used herein, the term "Requesting Party" (RQP) refers to a party that requests a proof of knowledge service from the PoK server. As such, the RP server may also be referred to as a RQP server.

As used herein, the term "AJAX" refers to Asynchronous JAVASCRIPT and XML, or any suitable communication technique used to send and receive data over the Internet from a server, or any suitable communication technique as understood by persons skilled in the art.

As used herein, the term "picture password" refers to using one or more known input actions associated with a known image to provide a password for access to secured information, and/or includes any suitable system or method for a proof of knowledge about an image that a user can readily remember.

As used herein, the term "hash" refers to a cryptographic salted hash, a cryptographic salted hash function (e.g., National Institute of Standards and Technology (NIST) approved SHA256 Password Based Key Derivation Function (PBKDF)), and/or a derivation of enciphered or encoded data used to authenticate the integrity of corresponding information or actions with well-known anti-dictionary attack protections afforded by cryptographic salting. A hash may also include a number of hash iterations as suggested by NIST approved PBKDF.

Before describing embodiments of the present disclosure, a description of problems associated with the implementation of conventional proofs of knowledge mechanisms is beneficial.

Existing systems use conventional identity management techniques to provide access control to services administered by a relying party. For example, a relying party such as a financial institution may administer a server that provides an online portal for users to access one or more financial services. The RP server authenticates a user seeking to access the financial services base on identity management techniques. For example, the RP server grants access rights to the services upon validating the user's identity based on a username and password. Existing systems may also limit access to one or more services depending on the identity of the user. For example, settings may be associated with different categories of users to control their level of access to particular services. Accordingly, existing systems rely on rigid identity management techniques to provide access control to services administered by a relying party.

These conventional identity management techniques may be inadequate for providing proper access control based on a user's circumstances or when a user's circumstances has changed. In other words, merely authenticating a user's identity to grant access to services provided by a relying party may be insufficient to provide a proper level of access to those services due to a condition or when the condition have changed. For example, in authenticating and authorizing a user for interacting with one or more websites (or, for example and without limitation, other Internet services), there are edge cases where validating the identity of the user is not sufficient to determine a proper authorization to perform some actions or view some types of information associated with a secured service.

Prototypical examples (i.e., use cases) where conventional identity management is inadequate to provide a proper level of access control has to do with a person's age and/or certain types of mental impairment caused by brain injury. Other use cases may exist for different ages, different injuries, or different states of mind of the person (e.g., a person having alcohol induced intoxication).

Anterograde amnesia is one use case where a person has deficient judgment due to a restricted mental capacity to remember current events, or to remember events engaged in by the person or that have happened to the person. This person may have an online financial account such as a bank account administered by a financial institution. The person may recall the person's username and password from memory, recall how to use a hardware security token, and/or how to provide a fingerprint or other biometrics that establish with high confidence that the person's identity is correct. However, the financial institution may not know the person's mental capacity is now diminished due to anterograde amnesia (i.e., a changed condition). Thus, the financial institution does not know that the person now has a diminished mental capacity. Unfortunately, conventional identity management techniques would provide the same access to secured services even though the person's diminished capacity could lead to actions that are detrimental to the person.

For example, a person with diminished mental capacity has a high risk for being confused enough to withdraw money from a bank account and perhaps even give the withdrawn money from the person's bank account to a caregiver without being able to later recall these events or share and/or relate these events to the person's spouse or guardian. Regardless of whether these events are discovered later or not, an improvement would be to preempt this situation by testing the person for this form of diminished mental capacity (e.g., dementia), and then perhaps still allow the disabled person to view account information but restrict some transfers of money in and out of the account, and limit outgoing transfers only to specific accounts that a more capable person (such as the person's spouse or guardian) can judge whether to actually release the money.

A seemingly simple solution to this problem is to have the financial institution perform an online test to determine if a person has sufficient mental capacity (e.g., is over a certain age) to access a level of services. However, such a solution immediately assigns the role of a healthcare provider to the financial institution and, as a consequence, burdens the financial institution with all the privacy issues that stem from knowing personal information about the person's health. This includes both statutory issues and ethical issues involved in knowing this type of personal information. Indeed, a person could legitimately fear that the financial institution would run mental capability tests on their own accord to determine if the person should be prevented from accessing a service (e.g., a website) regardless of whether such testing is right or wrong in terms of considering the person's well-being and/or irrespective of whether this person is experiencing an acute or chronic condition.

These examples generally belong to a class of capability testing within the domain of "advanced proofs of knowledge," as referred to herein with respect to the disclosed embodiments. The specific form of mental capability testing for the above examples can be more precisely referred to as "proofs of mental capability." Although the risk of abusing this form of testing exists, it is still desirable in some circumstances to run these tests in order to prevent the undesirable consequences associated with this class of use cases, such as enabling actions that are detrimental to a person having diminished capacity. As such, a need exits for testing users to determine a suitable level of access to services provided by a relying party, where the relying party remains isolated from knowing some personal information about the users.

There is a related need to prevent insider attacks on services provided by a relying party. An insider attack is a malicious attack perpetrated by a person with authorized access to the relying party. As such, an insider attack may be associated with a class of undesirable Internet access where a person knows the correct identity that can be used to access services provided by the relying party. The person may even be technically authorized to access the services. However, the relying party may make an incorrect assumption about what that person knows. For example, the relying party may presume that the person has been given verbal permission by an authority (e.g., such as the owner of a bank account) to access services, or has knowledge of a certain facility or room. A solution to avoid making the wrong assumption by the relying party would be to test the assumption before giving the person access to services including, for example, certain private data. But such tests could be ineffective if there is an insider attack because the test criteria and the tests that are run to check the assumption could have been compromised as part of the original attack. Further, as described earlier, there may be privacy issues that require guarding against the relying party (e.g., a website owner) knowing the tests that are actually performed.

The present disclosure solves the aforementioned drawbacks by providing systems, methods, and devices for using advanced proofs of knowledge that modify access to secured services in accordance with advanced capability testing. Identity management techniques may be used to authenticate a request from a user to access secured services provided by a relying party. Then the results of advanced capability testing are used to provide a specific level of access by the authenticated user to the secured services (e.g., full access, restricted access, read-only access).

In particular, advanced capability testing may include four components. The first component includes checking condition(s) that are used to determine which test(s), if any, to run for a user. The second component includes running the test(s) that satisfy the condition(s). The third component includes checking answer(s) provided by the user in response to the test(s). The fourth component includes obtaining results or outcomes based on the answer(s) to the test(s). The results or outcomes may be used to issue instructions to the relying party to perform action(s) such as granting particular access levels for the user to the secured services, issuing alerts, or the like. As such, the relying party may perform actions based on results determined from answers in response to tests that run under certain conditions.

Any combination of the conditions, tests, answers, and instructions causing the actions of the advanced capability testing may be predetermined or predefined by the user. In other words, the conditions, tests, answers, and instructions may be earlier provisioned or previously set up. In some embodiments, the tests may be determined randomly or pseudo randomly from a catalogue of options.

The advanced proofs of knowledge that modify access to secured services in accordance with advanced capability testing are provided by using three agents to authenticate a user and modify rights of that user to access secured services. The agents include a relying party (e.g., a financial institution and its website), the user, and a PoK service that authenticates the user on behalf of the relying party.

As such, some disclosed embodiments are an extension of the picture password system for web login disclosed in International Application No. PCT/US14/32342 entitled "METHOD AND SYSTEM OF PROVIDING A PICTURE PASSWORD PROOF OF KNOWLEDGE AS A WEB SERVICE," which is itself an extension of U.S. Pat. No. 8,813,183 entitled "METHOD AND SYSTEM FOR PROCESSOR OR WEB LOGON," and any related applications, which are all incorporated herein by reference in their entireties. Disclosed therein are picture password authentication systems that can utilize multiple tests to determine whether action(s) should be taken in accordance with instructions. Examples of the tests disclosed therein, which are used for proof of knowledge, include a separate "analogy test" or a "picture pointing test" to determine that any input is not provided by a robot attempting to provide a picture password as proof of knowledge.

When implementing picture passwords in the disclosed embodiments to authenticate a user, the PoK service uses a picture and input actions on the picture (or, for example without limitation, motion picture with audio and actions on the video or audio) to authenticate the user on behalf of the relying party. The user then undergoes testing to determine whether action(s) should be taken in accordance with instructions predefined by the user. For instance, the test(s) may be test(s) for proof of mental capacity such that the user is determined to have diminished mental capacity if the user does not successfully complete the test(s) and, otherwise, is determined to have sufficient mental capacity. If the user is determined to have diminished mental capacity via the test(s), instructions are communicated to the relying party to, e.g., limit access to secure information. In some embodiments, the instructions for access control may be implemented as advance directives defined by the user.

For example, an advanced proof of knowledge for a website may include a picture password used to login to a webpage that can access secured services including a private bank account, a brokerage account, an electronic billing or payment system, an email system, a web service system, an application service system, or the like. Using the advanced proof of knowledge, the PoK server authenticates a user seeking to access the secured services via the website of the relying party and tailors access to the secured services in accordance with one or more instructions defined by the user. In a particular implementation, one or more mental capability tests can be used to determine that a person is or is not in a state of anterograde amnesia (or, for example and without limitation, drunk, under a certain age, not knowledgeable about a particular facility) and access to secured services can be restricted accordingly.

FIG. 1 illustrates an advanced proof of knowledge authentication system 10 according to some embodiments of the present disclosure. The advanced proof of knowledge authentication system 10 (hereinafter sometimes referred to as the "system 10") may be formed from a combination of one or more servers and/or one or more client devices. As shown, the system 10 includes client devices 12-1, 12-2, and 12-3 (generally referred to herein collectively as client devices 12 and individually as client device 12), a RQP/RP server 14 (hereafter referred to as the RP server 14), and a PoK server 16, all interconnected via a network 18 (e.g., the Internet). In this example, the client devices 12 include a laptop computer 12-1, a desktop computer 12-2, and a mobile device 12-3. However, these are only examples. The client devices 12 can be any suitable type of device that can be used by a user to access the RP server 14.

In some embodiments, the RP server 14 and/or the PoK server 16 can be components of respective services that include one or more web servers that are remote from the client devices 12-1, 12-2, and 12-3. Optionally, the RP server 14 and the PoK server 16 may communicate over a channel separate from the network 18. For example, the client devices 12 may communicate with the servers 14 and 16 over the Internet, but the servers 14 and 16 may communicate with each other over a separate and secured network.

The PoK server 16 may operate to authenticate users of the client devices 12-1, 12-2, and 12-3 over the network 18 on behalf of the RP server 14. The PoK server 16 may also operate to test users of the client devices 12-1, 12-2, and 12-3 over the network 18 on behalf of the RP server 14, and provide instructions (e.g., which control access levels) to the RP server 14 based on the results of answers to the tests. The results of the advanced capability testing may include issuing instructions for access control that define one or more actions to be taken by the RP server 14 in the event that the user does not pass a test. In some embodiments, the instructions for access control may be implemented as advance directives defined by the user. For example, an advance directive may include an action that restricts access to services administered by the RP server 14 because the PoK server 16 determined that the results of testing indicate that a user has diminished mental capacity.

The RP server 14 provides a network portal over the network 18 to display an interface at the client device 12. For example, the network portal may include a website and the network 18 may include the Internet. The RP server 14 administers secured services (e.g., secured private information) that can be accessed via the website by a user operating the client device 12. For example, the RP server 14 may correspond to a server of a financial institution that administers a website for users to access account information over the Internet. However, this is only a particular example of using the advanced capability testing for high-risk transactions, where such an implementation would be beneficial to an institution responsible for administering such high-risk transactions. The disclosed embodiments should not be limited to this particular example. Instead, the advanced capability testing may be implemented by any other institution or entity that requires maintaining secure access to services that include private or sensitive information. For example, other institutions that may benefit from the use of advanced capability testing include healthcare institutions that administer private patient information via patient portals or the like.

The client device 12 can access the secured services administered by the RP server 14 via the website by providing information used to authenticate the user. For example, a user may input a username and password to login to a banking website. The username may be validated by the RP server 14, and the password may be validated by the PoK server 16 (on behalf of the RP server 14) to authenticate the user. This validation may provide access to the user's secured information. As such, a user can access secured information by demonstrating proof of knowledge of a username and password.

The PoK server 16 operates to authenticate users on behalf of the RP server 14. For example, the client device 12 can communicate directly with the RP server 14 to seek access to private information via a login page of a website administered by the RP server 14. The RP server 14 requests a picture password service from the PoK server 16 to authenticate the user on behalf of the RP server 14. The PoK server 16 redirects the client device 12 to the PoK server 16 and invokes an interface at the client device 12, which is used to authenticate the picture password by the PoK server 16 on behalf of the RP server 14.

This mechanism isolates the source of secured services (e.g., the private information) at the RP server 14 from the authentication mechanism at the PoK server 16, which improves security by separating mechanisms that administer services and information from mechanisms that administer proofs of knowledge. As such, the RP server 14 knows the identity of a user and uses an identifier for that user to request an authentication for the user by using the picture password from the PoK server 16 for that user. The PoK server 16 knows the picture password, including the image for the picture password and the input actions used as proof of the user's knowledge. However, the RP server 14 does not know the picture password, and the PoK server 16 does not know the user's identity (e.g., the user remains anonymous to the PoK server 16).

The disclosed embodiments test the user, in addition to authenticating a picture password, to dynamically control access to secured services. Generally speaking, it is preferable for the user that may be subjected to one or more tests (e.g., mental capacity tests) to have authorized such testing in advance. The RP server 14 will not know the test(s) but will know something abstract about the tests such as whether an instruction has failed due to the results of a test and/or, for example, that the user only wants to be able to read but not download or move resources administered by the secured services except by other persons that were given the user's authorization (e.g., given a power of attorney). The PoK server 16 does not know the identity of the person being tested, and the RP server 14 does not know what tests the person has passed or failed. Thus, neither the PoK server 16 nor the RP server 14 are sufficiently knowledgeable of a user's private information to be considered a healthcare provider since neither are able, on their own, to associate a person with a mental capacity test.

As such, the disclosed embodiments provide a privacy guarantee that is built on identity management techniques that are enriched with advanced capability testing to modify access requests by using, for example, an Application Programming Interface (API) that includes desired access limitations (such as read-only access, etc.). The PoK server 16 modifies attributes of access by an authenticated user to services administered by the RP server 14 in accordance with advanced capability testing that may be defined by a user or defined by another party. Again, the advanced capability testing includes instructions that define actions to be taken by the RP server 14 in the event that the user passes and/or fails tests that may be defined by the user.

Figure 2:
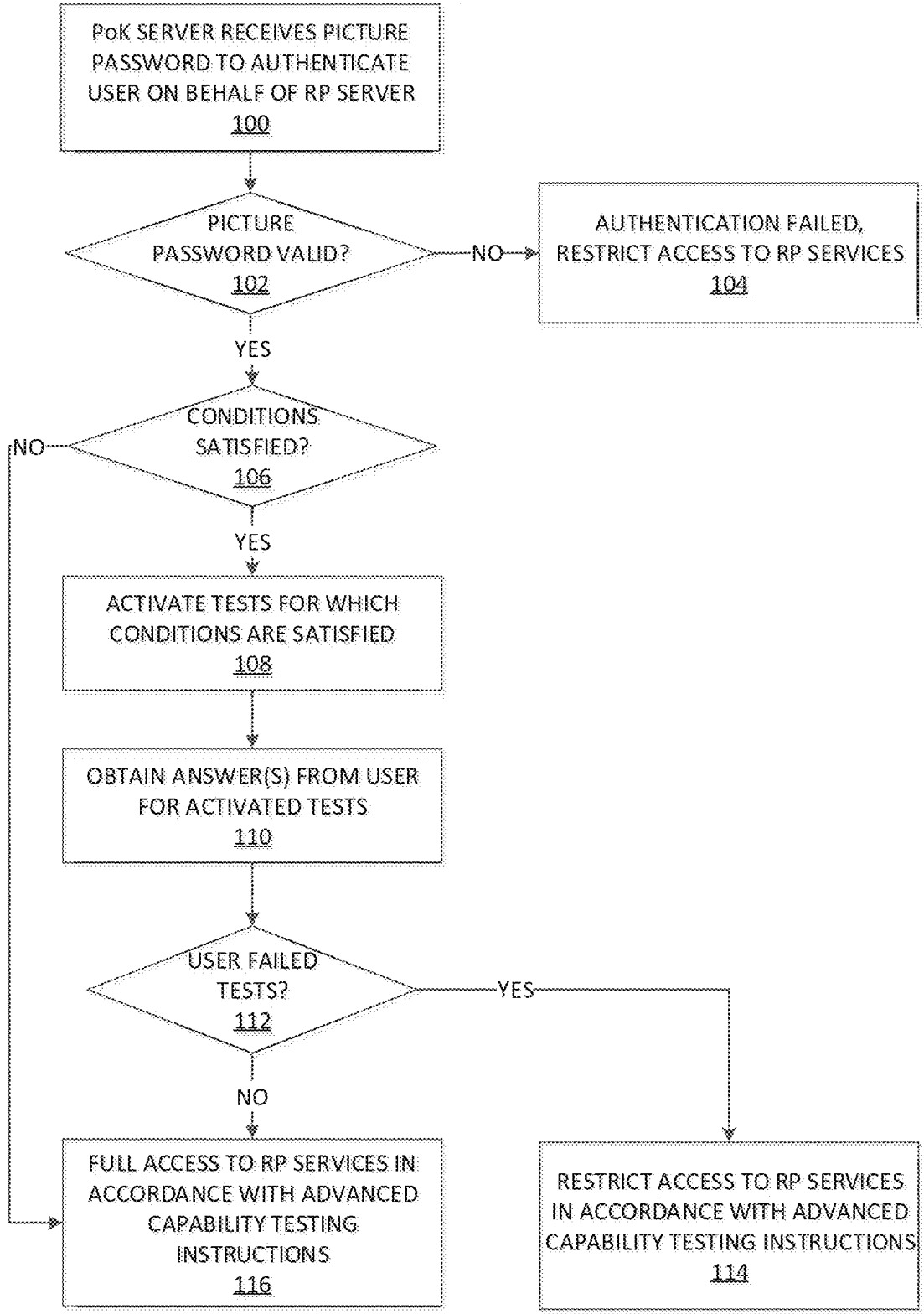
FIG. 2 is a flow chart that illustrates the operation of an advanced proof of knowledge authentication system including a proof of knowledge server to, during authentication of a user on behalf of a relying party server, determine whether action(s) should be taken in accordance with instructions of the user according to some embodiments of the present disclosure.

FIG. 2 is a flow chart that illustrates the operation of the advanced proof of knowledge authentication system 10 according to some embodiments of the present disclosure. The PoK server 16 receives a communication from the client device 12, where the communication is used by the PoK server 16 to authenticate a user on behalf of the RP server 14 (step 100). For example, the authentication may be based on identity management techniques that verify a user's identity by validating a username at the RP server 14 and validating a picture password at the PoK server 16. The PoK server 16 authenticates the user's identity if an entered picture password is correct (step 102), and, if authentication fails, informs the RP server 14 such that the RP server 14 may restrict access of the user (step 104).

Returning to step 102, upon authentication of the user's identity, a determination is made about whether any one or more predetermined conditions for advanced capability testing are satisfied (step 106). These conditions are used to determine whether advanced capability testing is to be performed and/or to determine which of multiple predefined tests are to be activated or deactivated (i.e., to determine which of multiple predefined tests are to be used). As an example, for each of multiple predefined tests, the condition that defines whether the test is to be activated or deactivated may include a condition that the test is always activated, a condition that the test is to be activated upon request (e.g., a request from the user or another party), a condition that the test is to be activated for predetermined dates or times, or a condition that the test is to be activated based on a triggering event (e.g., triggered by an input from a user). For example, a predetermined condition may include activating one or more mental capacity tests late at night when a particular user is more likely to experience diminished mental capacity due to, for example, alcohol intoxication. If none of the conditions are satisfied, then tests are not activated and full access to services provided by the RP server 14 are granted in accordance with instructions for access control (step 116).

Returning to step 106, if one or more of the conditions are satisfied, one or more tests are activated (step 108). The PoK server 16 may then provide an interface at the client device 12 to obtain answers from the user for the activated tests (step 110). The PoK server 16 determines whether the user passed or failed the activated test(s) (step 112). If the user passed the activated test(s), then full access may be granted to the services provided by the RP server 14 in accordance with instructions for the advanced capability testing (step 116). In other words, the PoK server 16 informs the RP server 14 that the user is authenticated.

On the other hand, if the user failed the activated test(s) in step 112, then restricted access may be granted to the services provided by the RP server 14 in accordance with instructions for the advanced capability testing (step 114). In other words, the PoK server 16 informs the RP server 14 that the user is authenticated but that one or more actions are to be taken in accordance with one or more instructions for the advanced capability testing of the user (e.g., access to secure information/services is to be limited). In some embodiments, the tests, instructions, and/or conditions may be predefined or predetermined by the user such that the access to secured services is dynamically tailored according to the user's predetermined circumstances. In some embodiments, the tests, instructions, and/or conditions may be predefined or predetermined by an entity other than the user such that the access to secured services is dynamically tailored according to the that entity's needs.

As such, the PoK server 16 generally does not know the results of the testing. Instead, the PoK server 16 just checks answers received from the client device 12 against what are known to be correct answers. The PoK server 16 does not have visibility into the current answers sent by the client device 12 operated by the user, nor have visibility into the known correct answer. Instead, the PoK server 16 knows only sufficient information to determine if the answers match (e.g., if cryptographic hashes match).

Figure 3A:
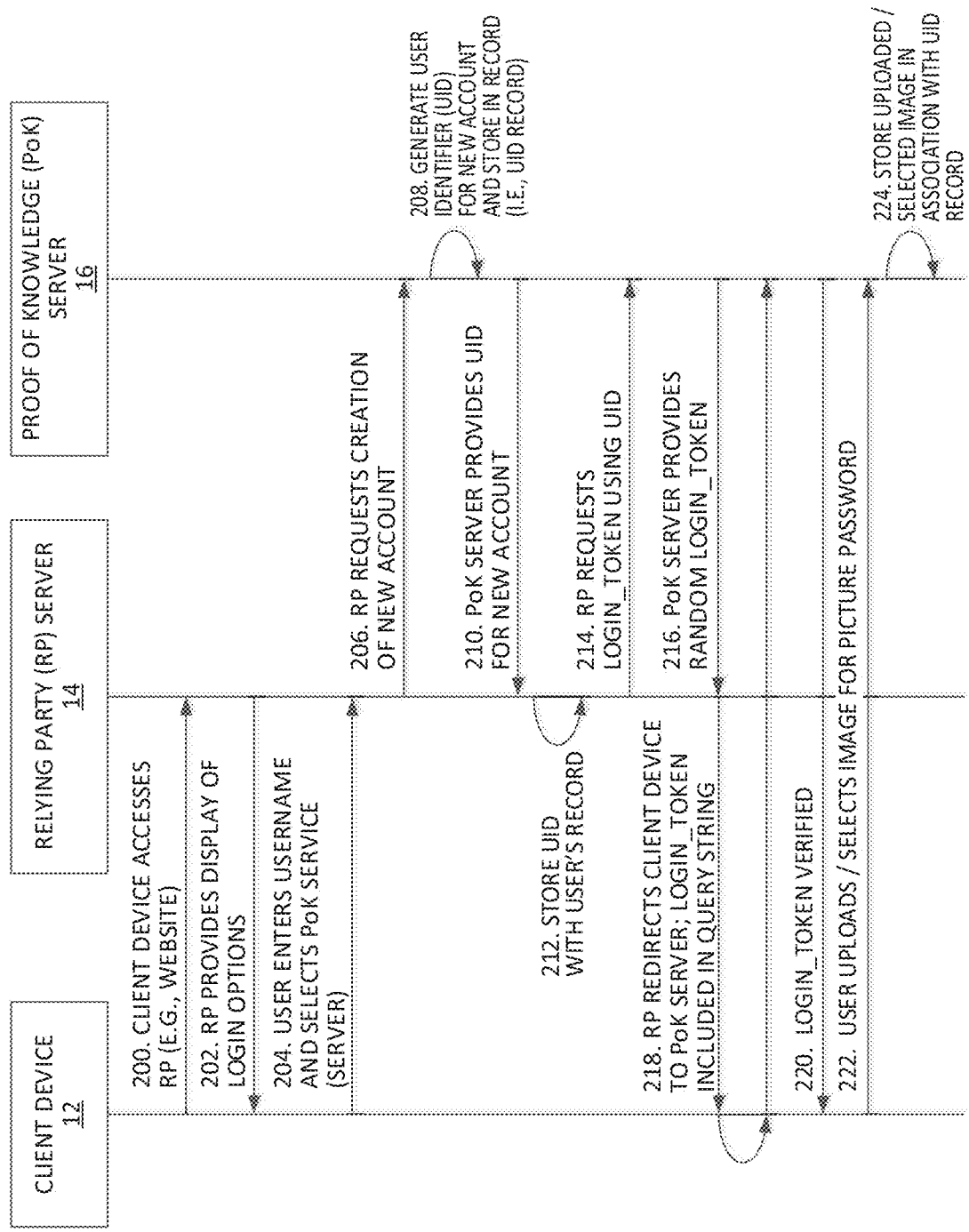
FIGS. 3A and 3B illustrate the operation of the advanced proof of knowledge authentication system of FIG. 1 during provisioning of a picture password as a proof of knowledge according to some embodiments of the present disclosure.
Figure 3B:
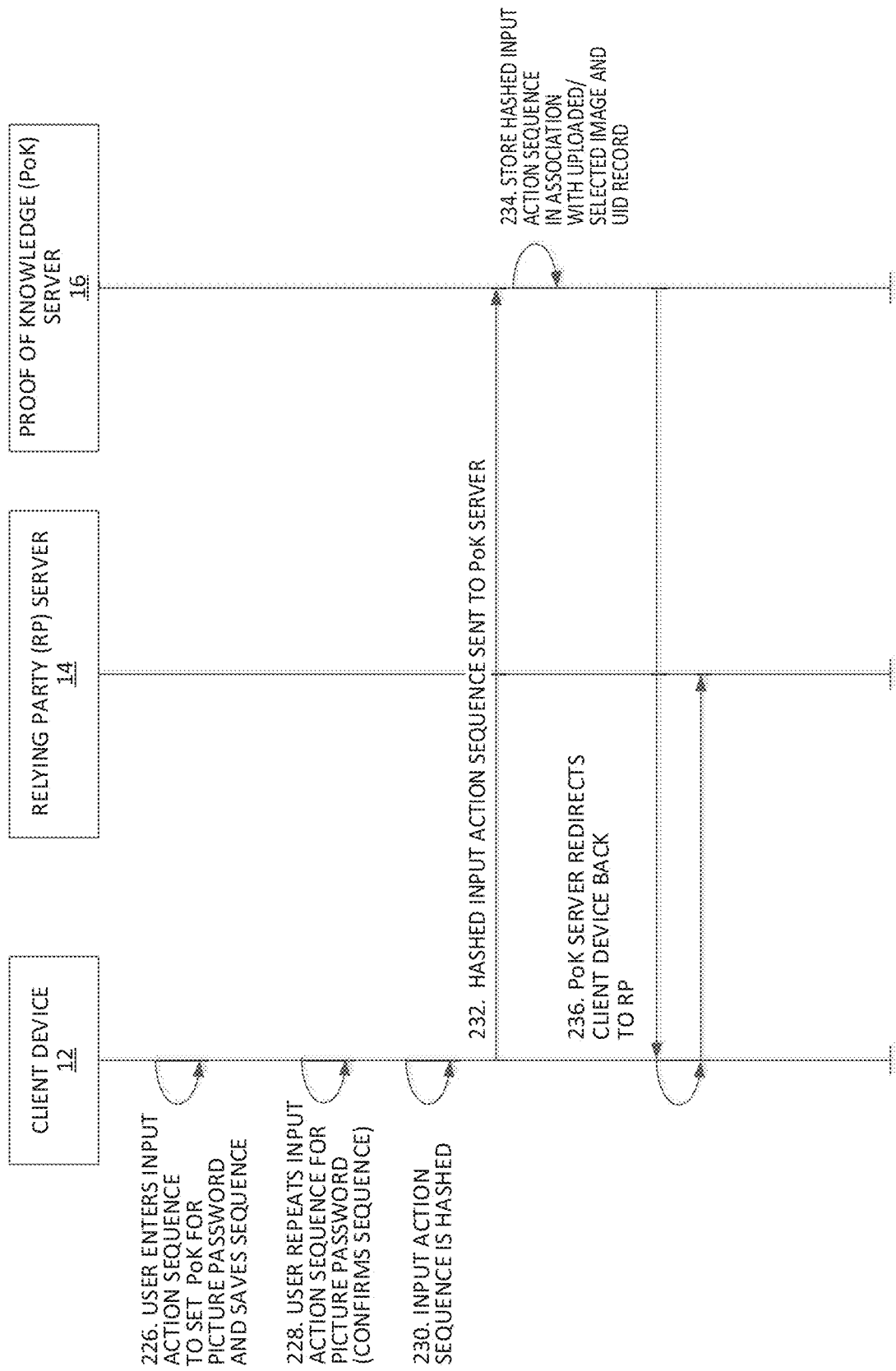
Figure 4:
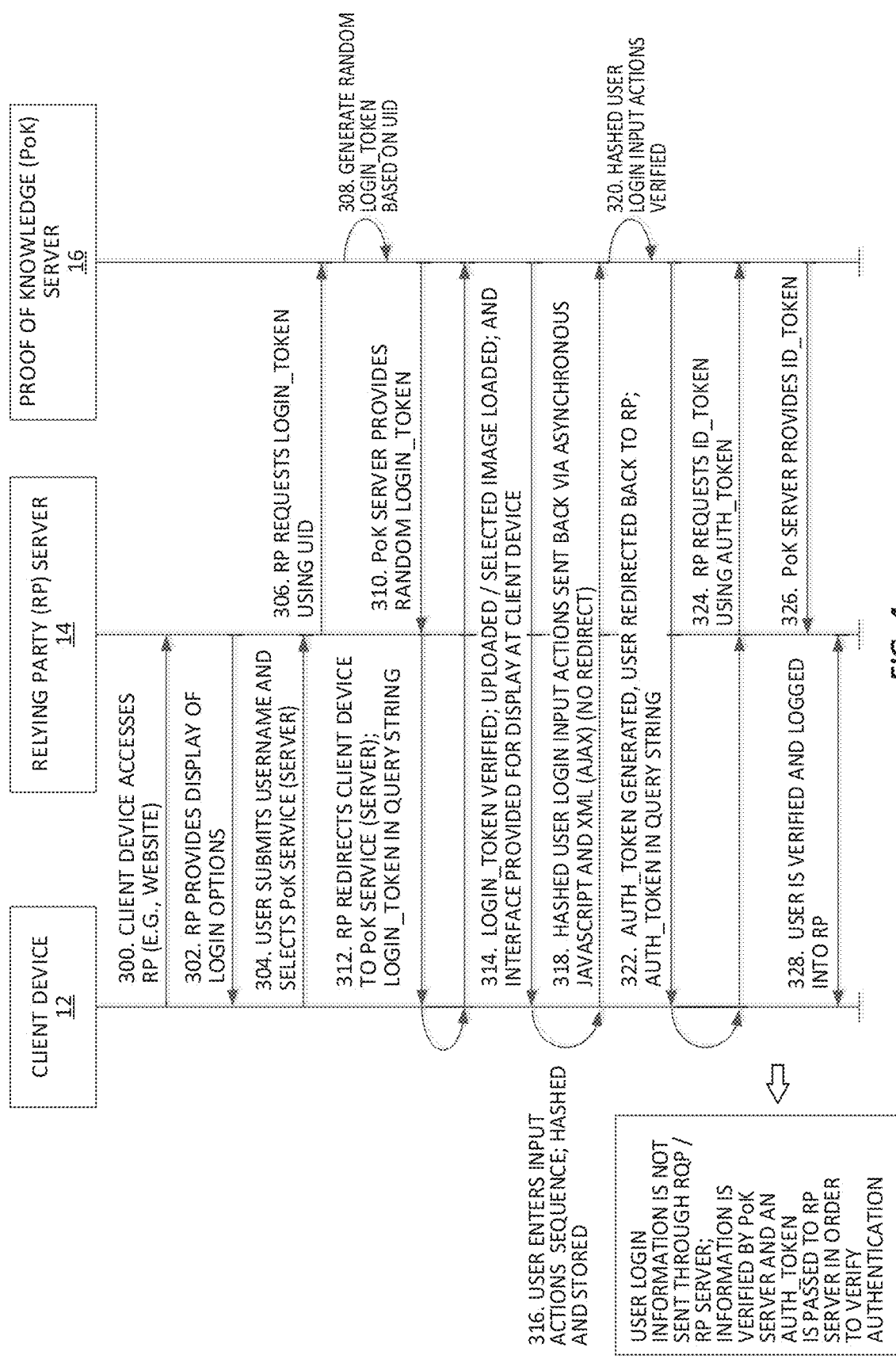
FIG. 4 illustrates the operation of the advanced proof of knowledge authentication system of FIG. 1 during use of the provisioned picture password from FIGS. 3A and 3B as proof of knowledge according to some embodiments of the present disclosure.
Figure 7:
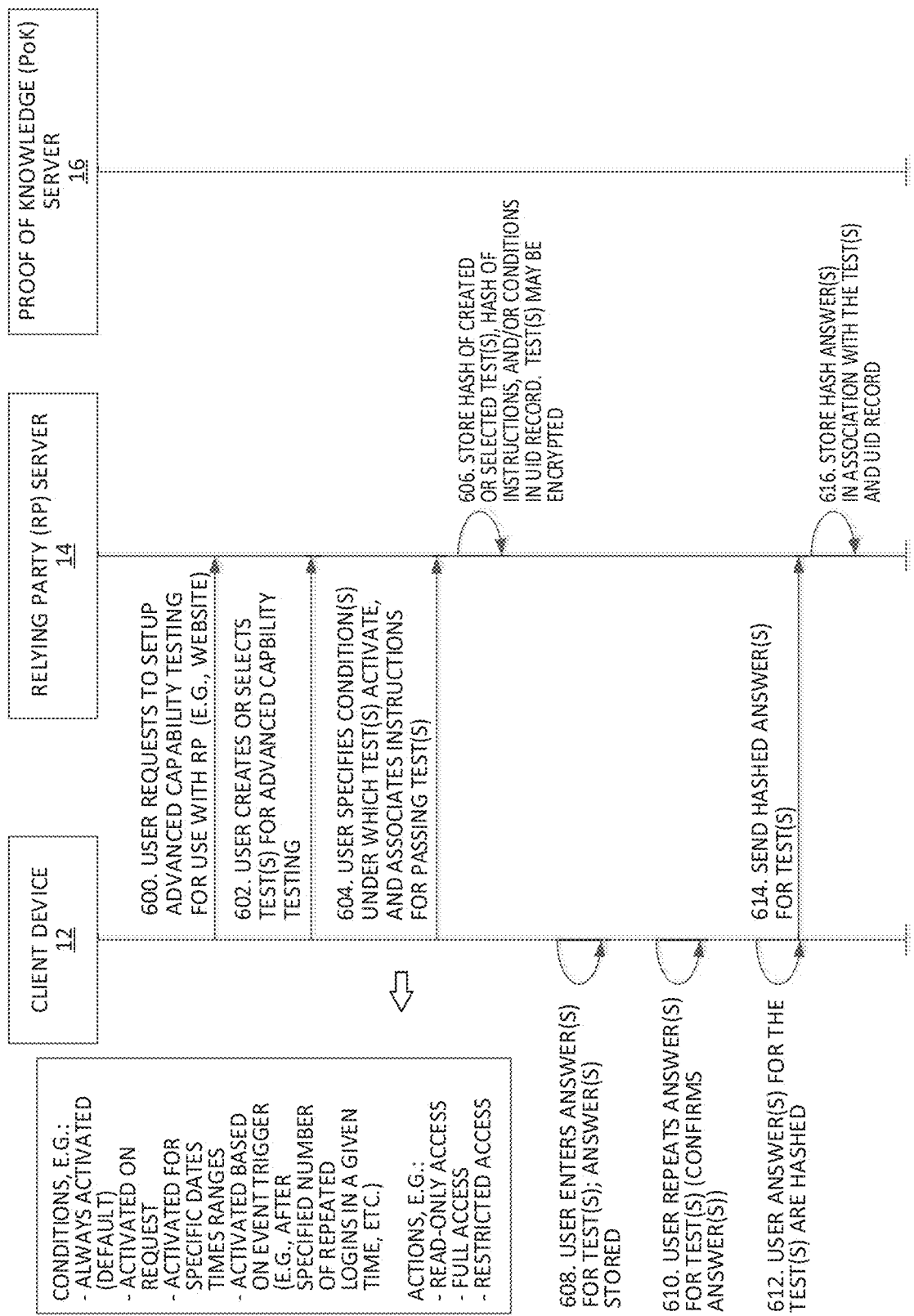
FIG. 7 illustrates the operation of the advanced proof of knowledge authentication system of FIG. 1 during provisioning of advanced capability testing at a relying party server according to some embodiments of the present disclosure.
Figure 8A:
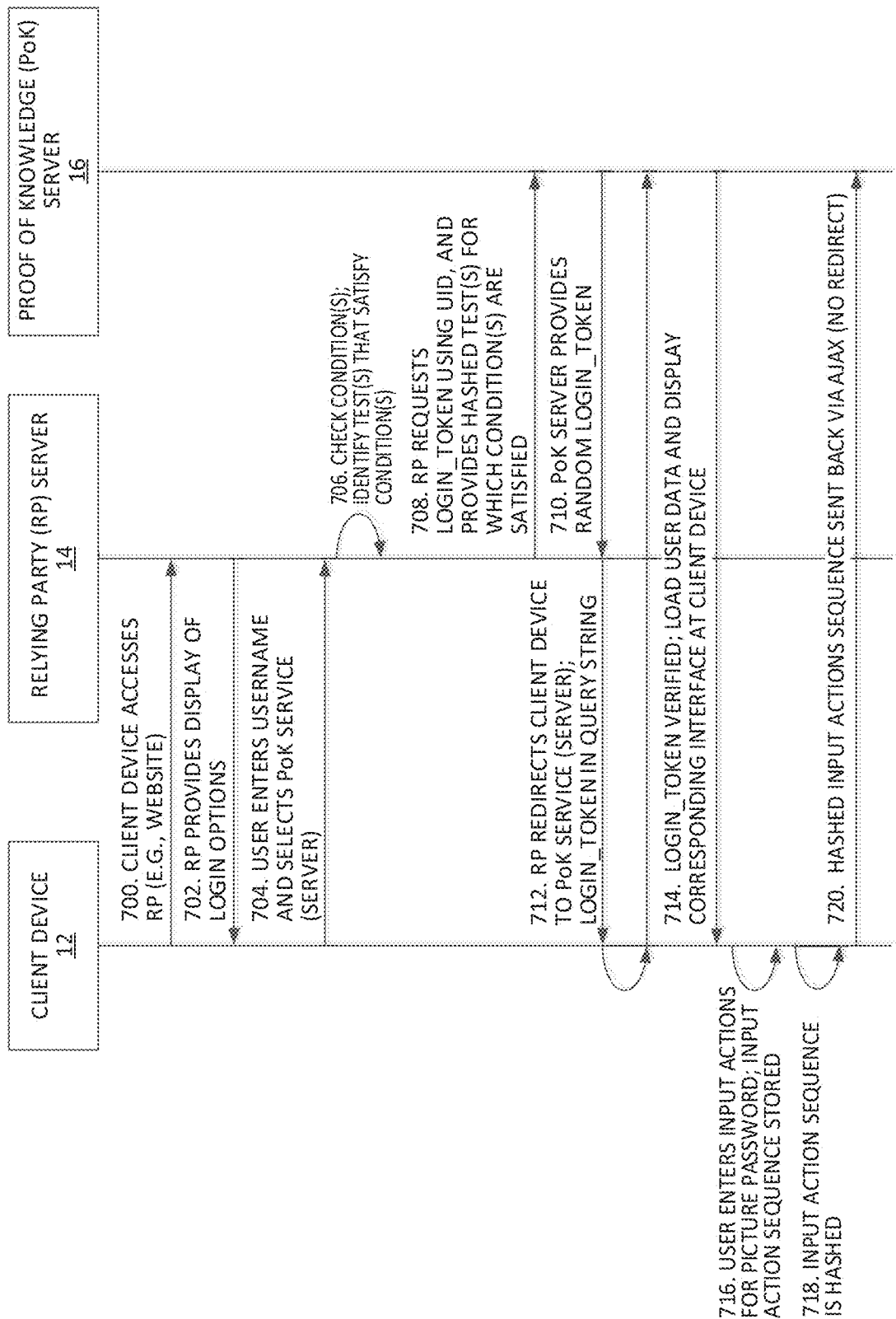
FIGS. 8A and 8B illustrate the operation of the advanced proof of knowledge authentication system of FIG. 1 during use of the advanced capability testing provisioned in FIG. 7 according to some embodiments of the present disclosure.
Figure 8B:
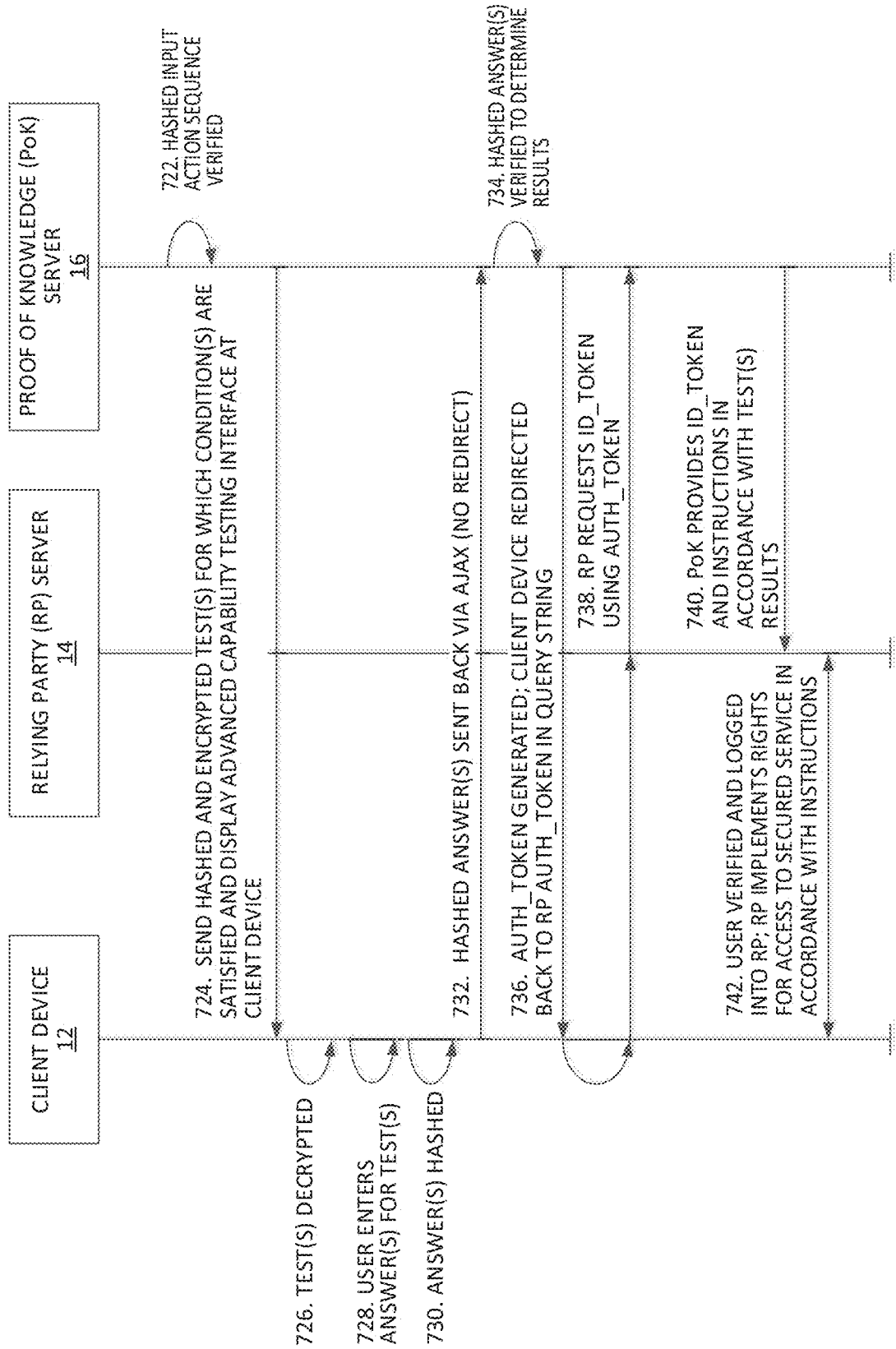
Figure 9:
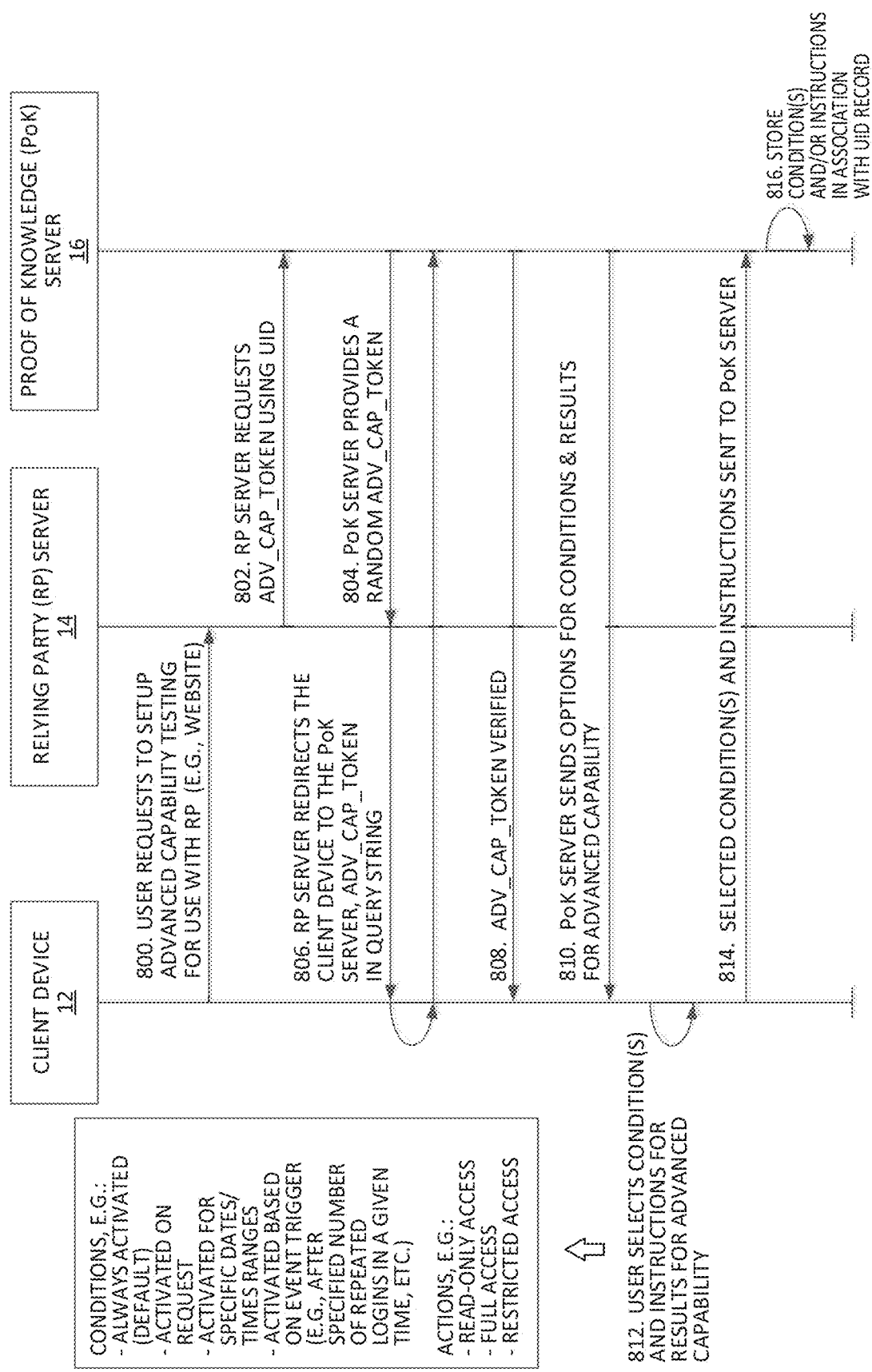
FIG. 9 illustrates the operation of the advanced proof of knowledge authentication system of FIG. 1 during provisioning of advanced capability testing without predefining one or more tests according to some embodiments of the present disclosure.
Figure 10A:
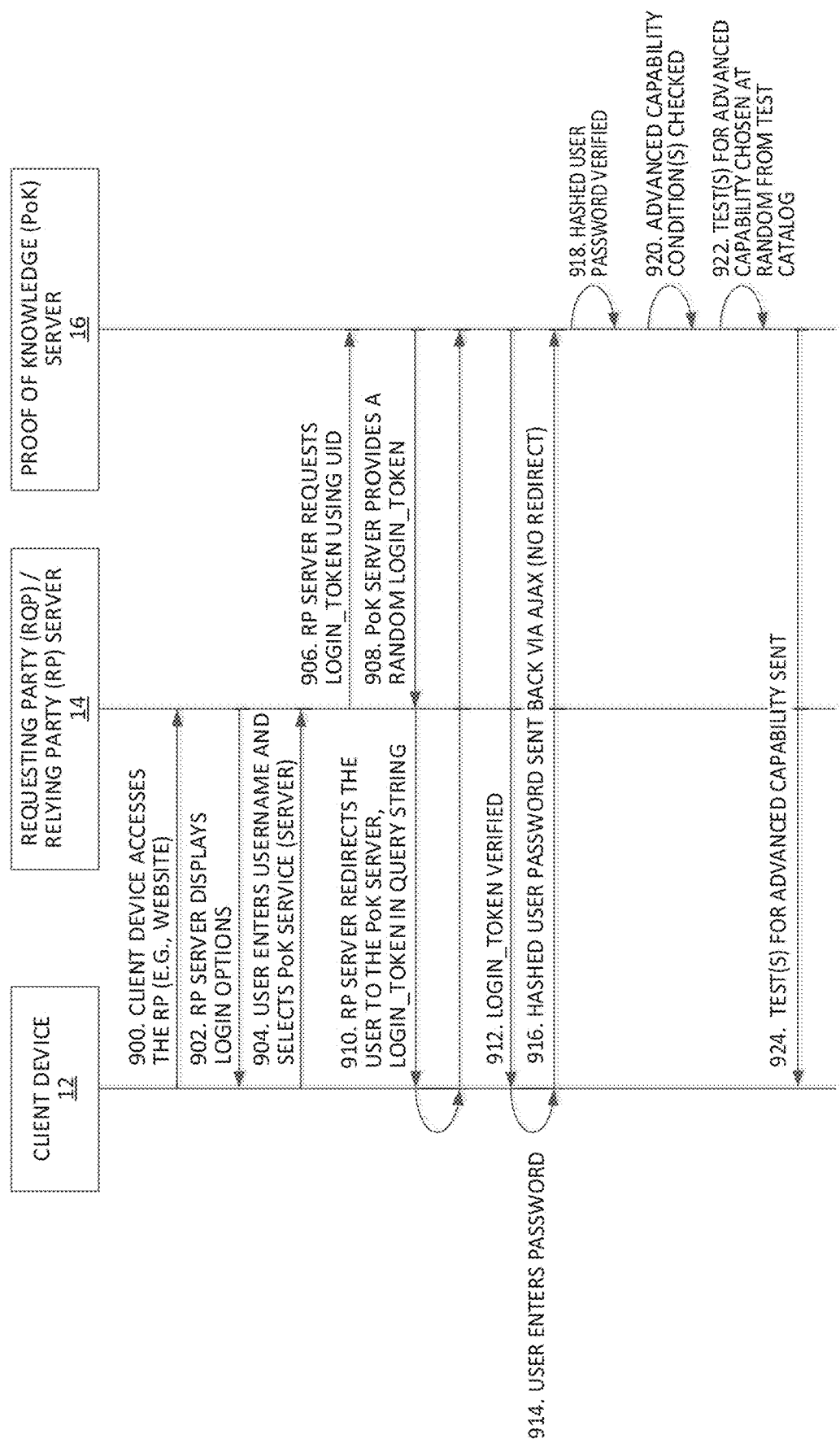
FIGS. 10A and 10B illustrate the operation of the advanced proof of knowledge authentication system of FIG. 1 with the tests being randomly or pseudo randomly selected during use of the advanced capability testing provisioned in FIG. 9 according to some embodiments of the present disclosure.
Figure 10B:
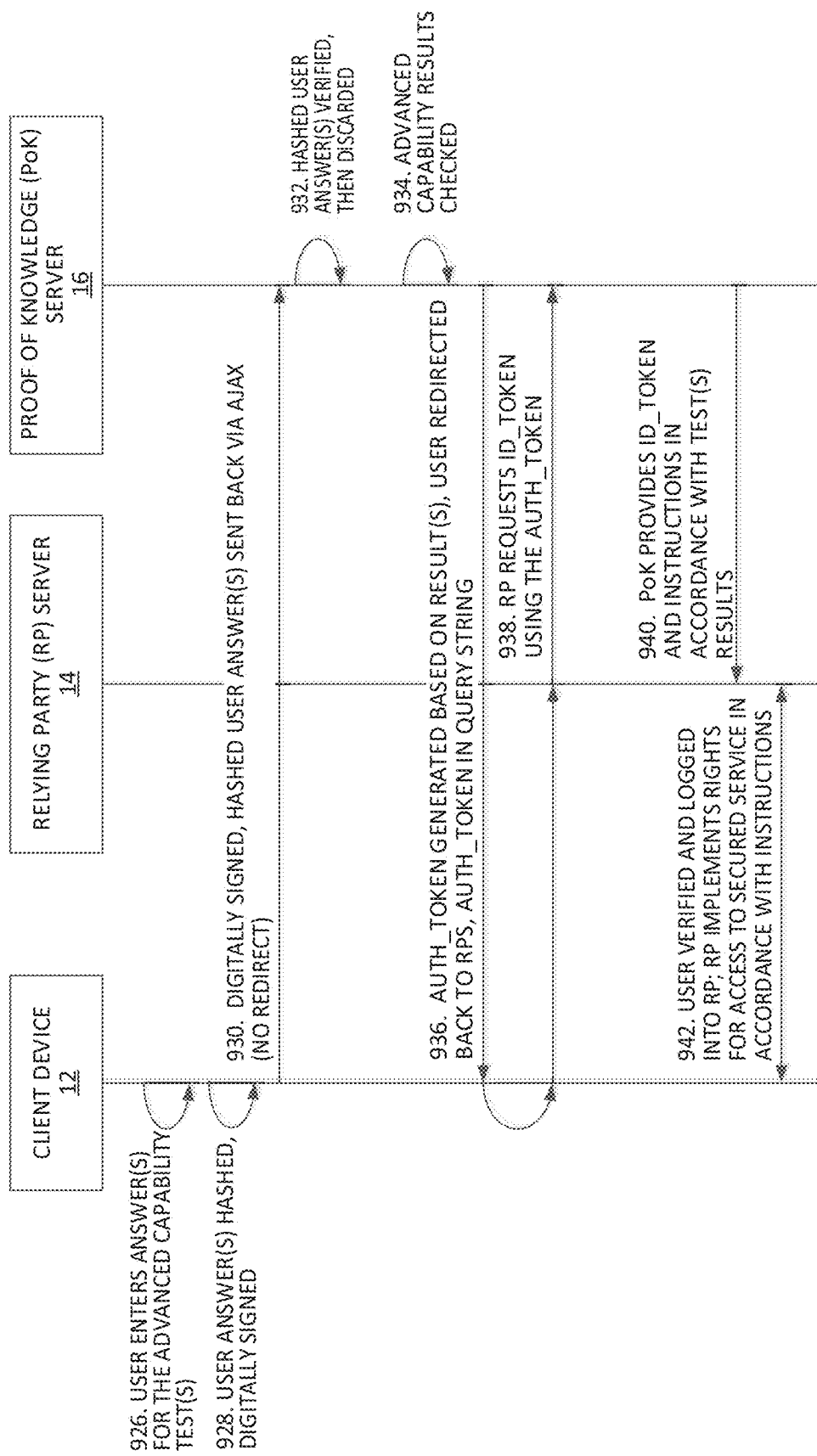

The advanced proof of knowledge authentication system 10 detailed above includes features for provisioning and utilizing mechanisms that authenticate a user, and for provisioning and utilizing mechanisms that modify access controls in accordance with advanced capability testing. FIGS. 3A through 8B are diagrams that illustrate the mechanisms for provisioning and using a picture password to authenticate a user and illustrate the mechanisms for provisioning and using advanced capability testing to modify access controls. In particular, FIGS. 3A, 3B, and 4 are diagrams that illustrate mechanisms for provisioning and using, respectively, a picture password to authenticate a user operating the client device 12. FIGS. 5A, 5B, 6A, and 6B are diagrams that illustrate a first embodiment for provisioning and using the advanced capability testing, respectively. FIGS. 7, 8A, and 8B are diagrams that illustrate a second embodiment for provisioning and using the advanced capability testing, respectively. Lastly, FIGS. 9, 10A, and 10B are diagrams that illustrate a third embodiment for provisioning and using the advanced capability testing, respectively.

FIGS. 3A and 3B are a diagram that illustrates provisioning of a picture password as proof of knowledge according to some embodiments of the present disclosure. As indicated above, a username and a picture password may authenticate a user that seeks to access a service provided by the RP server 14, such as a user's bank account that includes private information. The PoK server 16 provisions the picture password for the user on behalf of the RP server 14. As such, the RP server 14 knows the username and private information of the user but does not know the user's picture password. Similarly, the PoK server 16 has information sufficient to validate the user's picture password but does not know the user's username and private information.

As shown, a user operating the client device 12 accesses a network portal (e.g., a website) administered by the RP server 14 to provision (i.e., setup) login information for accessing one or more services provided by the RP server 14 (step 200). In response, the RP server 14 provides an interface that displays options to create the login information (step 202). The user may then enter a username and select a PoK service (step 204). If the PoK service is selected, the RP server 14 sends a request to the PoK server 16 to create login information for a new account (step 206). The request does not include information that reveals the identity of the user, which maintains the anonymity of the user at the PoK server 16. The PoK server 16 then generates a User Identifier (UID) for the new account and stores the UID in a new record (i.e., the UID record) that may be stored in a database of UID records (step 208). The UID is subsequently used as an alias for the user when communicating with the PoK server 16. The PoK server 16 returns the UID to the RP server 14 to store the UID in a record for the user (steps 210, 212).

After the new account is created at the RP server 14, the UID is used to request a login_token from the PoK server 16 (step 214). The PoK server 16 then returns a random login_token to the RP server 14 (step 216), and the RP server 14 redirects the client device 12 to a portal administered by the PoK server 16 (step 218).

After the PoK server 16 has verified the login_token, the client device 12 communicates directly with the PoK server 16 (step 220). The user is then prompted to upload or select an image as a picture password image (step 222). The PoK server 16 then stores the uploaded or selected image in association with the UID record for the user (step 224). The user then enters a sequence of input actions for picture password, and saves the input action sequence at client device 12 (step 226). The input actions may be saved in memory for the purpose of allowing the user to test when the input actions are repeated to confirm the input actions. As such, the user is prompted to confirm the input action sequence by re-entering the same input action sequence (step 228). The input action sequence is then hashed, and the hashed input action sequence is communicated to the PoK server 16 (steps 230, 232). The PoK server 16 stores the hashed input action sequence in association with the uploaded or selected image and UID record (step 234). Lastly, the PoK server 16 redirects the client device 12 back to the RP server 14 (step 236).

FIG. 4 is a diagram that illustrates utilizing the provisioned picture password from FIGS. 3A and 3B to authenticate a user according to some embodiments of the present disclosure. The PoK server 16 authenticates the picture password on behalf of the RP server 14 so that the user can access the secured services administered by the RP server 14. As shown, the user operating the client device 12 accesses a network portal (e.g., a website) administered by the RP server 14 to access the service provided by the RP server 14 (step 300). In response, the RP server 14 provides an interface that displays options to login to the service provided by the RP server 14 (step 302). For example, the user enters a username and selects the PoK service (step 304). If the PoK service is selected, the RP server 14 requests a login_token from the PoK server 16 by using the user's UID (step 306). The PoK server 16 then generates a random login_token and returns it to the RP server 14 (steps 308, 310).

The RP server 14 provides the random login_token to the client device 12 in a query string to redirect the client device 12 to a portal administered by the PoK server 16 (step 312). After the PoK server 16 verifies the random login_token, an interface is provided for display at client device 12, which includes the uploaded or selected image for the picture password (step 314). The user inputs a sequence of input actions, which are hashed and saved in memory at the client device 12 (step 316). The hashed input action sequence is sent back to the PoK server 16 via an asynchronous JAVASCRIPT and XML (AJAX) (step 318). However, this is only an example. In some embodiments, the hashed input action sequence may be sent back to the PoK server 16 via comparable technologies that allow web applications to send data to and retrieve data from a server asynchronously (e.g., in a background process) without interfering with the display at the client device 12 and the behavior of the existing displayed webpage.

The PoK server 16 then verifies the hashed input action sequence (step 320). If the hashed input action sequence is verified, the PoK server 16 generates an auth_token that is communicated in a query string to the client device 12, which redirects the client device 12 back to the RP server 14 (step 322). The RP server 14 then requests an id_token from the PoK server 16 by using the auth_token (step 324). The PoK server 16 provides the id_token to the RP server 14 (step 326). As such, the user is verified and logged in to the RP service if the user demonstrates proof of knowledge of the picture password (step 328). Notably, the login information is not sent through the RP server 14. Instead, the PoK server 16 verifies the login information and passes an auth_token to the RP server 14 to authenticate the user. As such, the PoK server 16 authenticates a user on behalf of the RP server 14.

There are a variety of ways to provision and use advanced capability testing, which provide instructions that modify access by an authenticated user to services provided by the RP server 14. FIGS. 5A, 5B, 6A, and 6B are diagrams that illustrate a first embodiment for provisioning advanced capability testing at the PoK server 16 and utilizing the provisioned advanced capability testing, respectively. FIGS. 7, 8A, and 8B are diagrams that illustrate a second embodiment for provisioning advanced capability testing at the RP server 14 and utilizing the provisioned advanced capability testing, respectively. FIGS. 9, 10A, and 10B are diagrams that illustrate a third embodiment for provisioning advanced capability testing and utilizing the provisioned advanced capability testing, respectively. As such, this disclosure provides at least three ways that a person can provision advanced capability testing, and two ways to utilize the advanced capability testing. Although the first, second, and third embodiments are shown in separate figures, the steps from the separate figures could be combined in any way to achieve any suitable mechanism to provision and use the advanced capability testing.

Figure 5A:
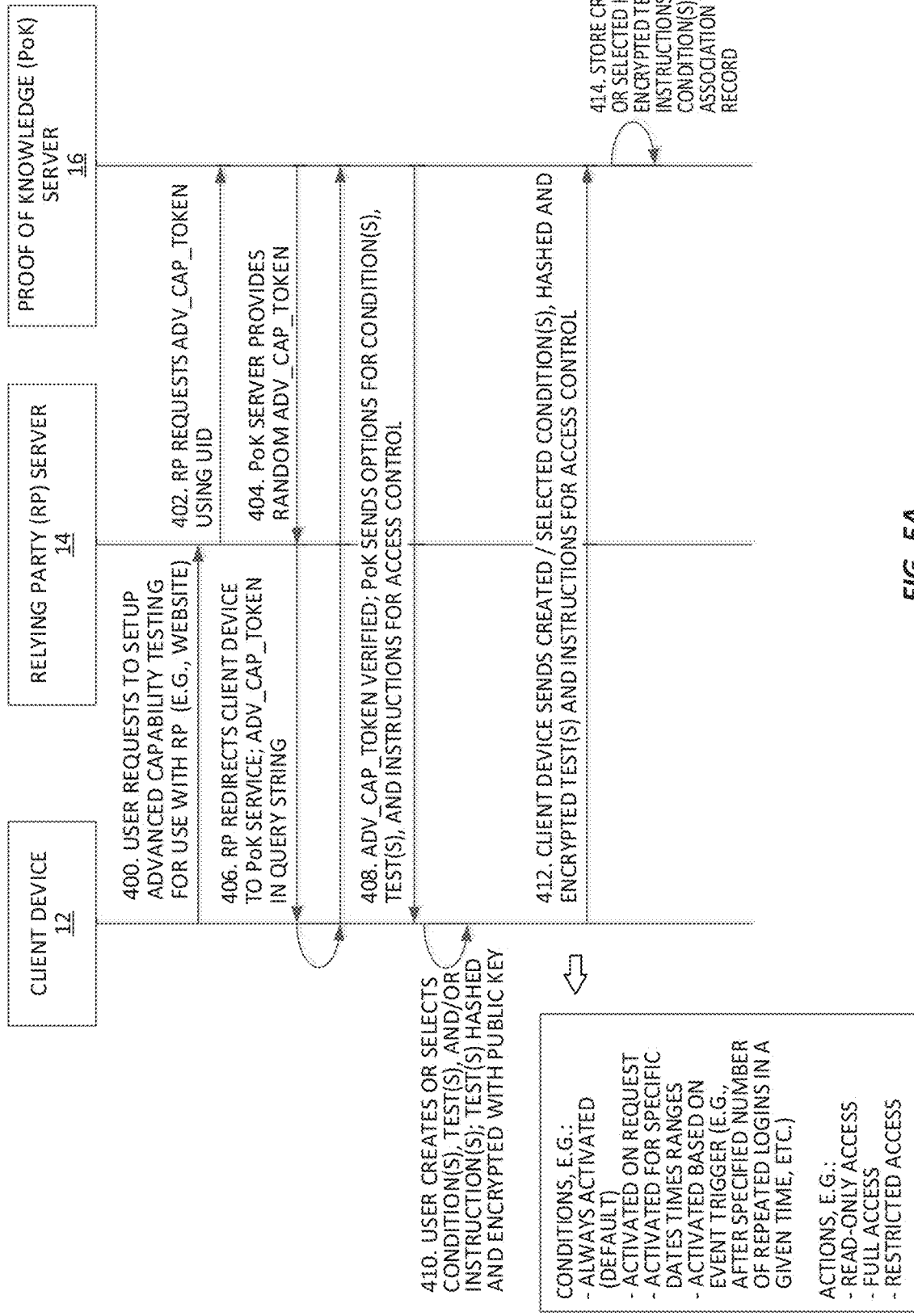
FIGS. 5A and 5B illustrate the operation of the advanced proof of knowledge authentication system of FIG. 1 during provisioning of advanced capability testing at the proof of knowledge server according to some embodiments of the present disclosure.
Figure 5B:
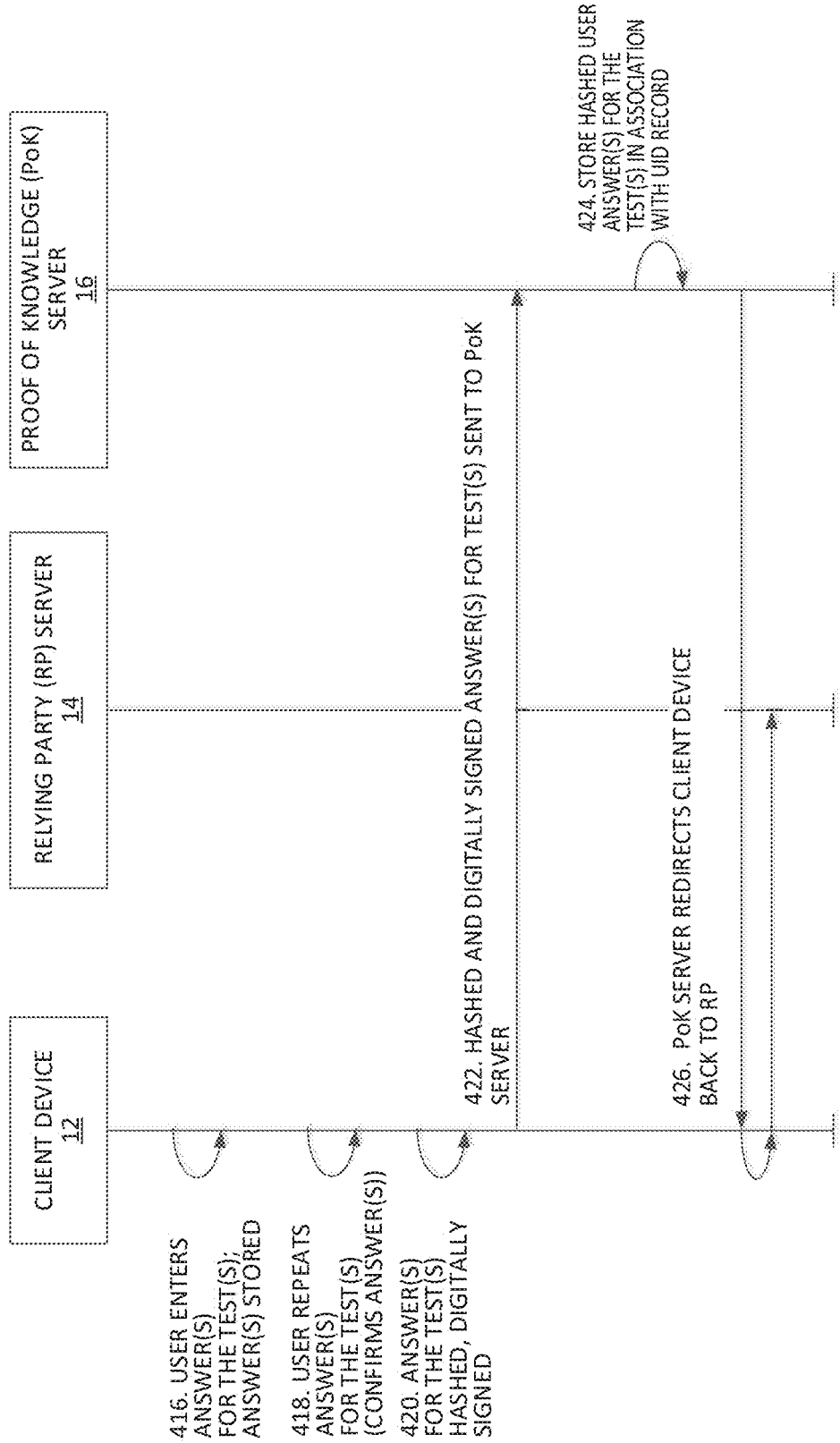

FIGS. 5A and 5B are a diagram that illustrates a process for provisioning advanced capability testing at the PoK server 16 according to a first embodiment of the present disclosure. As shown, a user communicates with the RP server 14 to request to setup of one or more instructions for advanced capability testing for use to access services provided by the RP server 14 (step 400). In response, the RP server 14 requests an adv_cap_token from the PoK server 16 by using the UID (step 402). The PoK server 16 provides a random adv_cap_token to the RP server 14, which is used to redirect the client device 12 to the PoK server 16 by communicating the random adv_cap_token in a query string to the client device 12 (steps 404, 406).

Upon verifying the random adv_cap_token from the client device 12, the PoK server 16 provides one or more options for conditions, tests, instructions for access control, and an interface for display at the client device 12 (step 408). The user operating the client device 12 then creates or selects one or more conditions, one or more tests, and one or more instructions for access control based on results of the advanced capability testing (step 410).

The specified conditions determine which tests activate when the conditions are satisfied. The conditions may include, for example, always activated, activated on request, activated for specific dates or time ranges, and activated based on an event trigger (e.g., after a specified number of logins in a given time). In some embodiments, the condition of "always activated" is the default condition, and the one or more tests are deactivated based on whether the one or more conditions are not satisfied. In some embodiments, the tests that were defined by the user at the PoK server 16 are hashed and encrypted using a public key. The instructions that were defined by the user at the PoK server 16 define one or more actions to be taken by the RP server 14 in the event that the user subsequently passes or fails one or more of the tests defined by the user. The actions may include, for example, providing read-only access, full access, restricted access, or the like.

The specified conditions, hashed and encrypted tests, and instructions for access control are sent to the PoK server 16 (step 412). The PoK server 16 stores the one or more tests, instructions, and/or conditions in association with the UID record for the user (step 414). The particular order for predefining or predetermining conditions, tests, and/or instructions is not limited to the order described above and may be practiced in any order.

The user of the client device 12 enters and stores one or more answers for the one or more tests and confirms the answers by re-entering the one or more answers (steps 416, 418). The client device 12 then hashes and digitally signs the one or more answers, and communicates the hashed and digitally signed answers to the PoK server 16 (steps 420, 422). The PoK server 16 stores the hashed answers in association with the UID record for the user (step 424). Lastly, the PoK server 16 redirects the client device 12 back to the RP server 14 after the advanced capability testing has been provisioned (step 426).

Figure 6A:
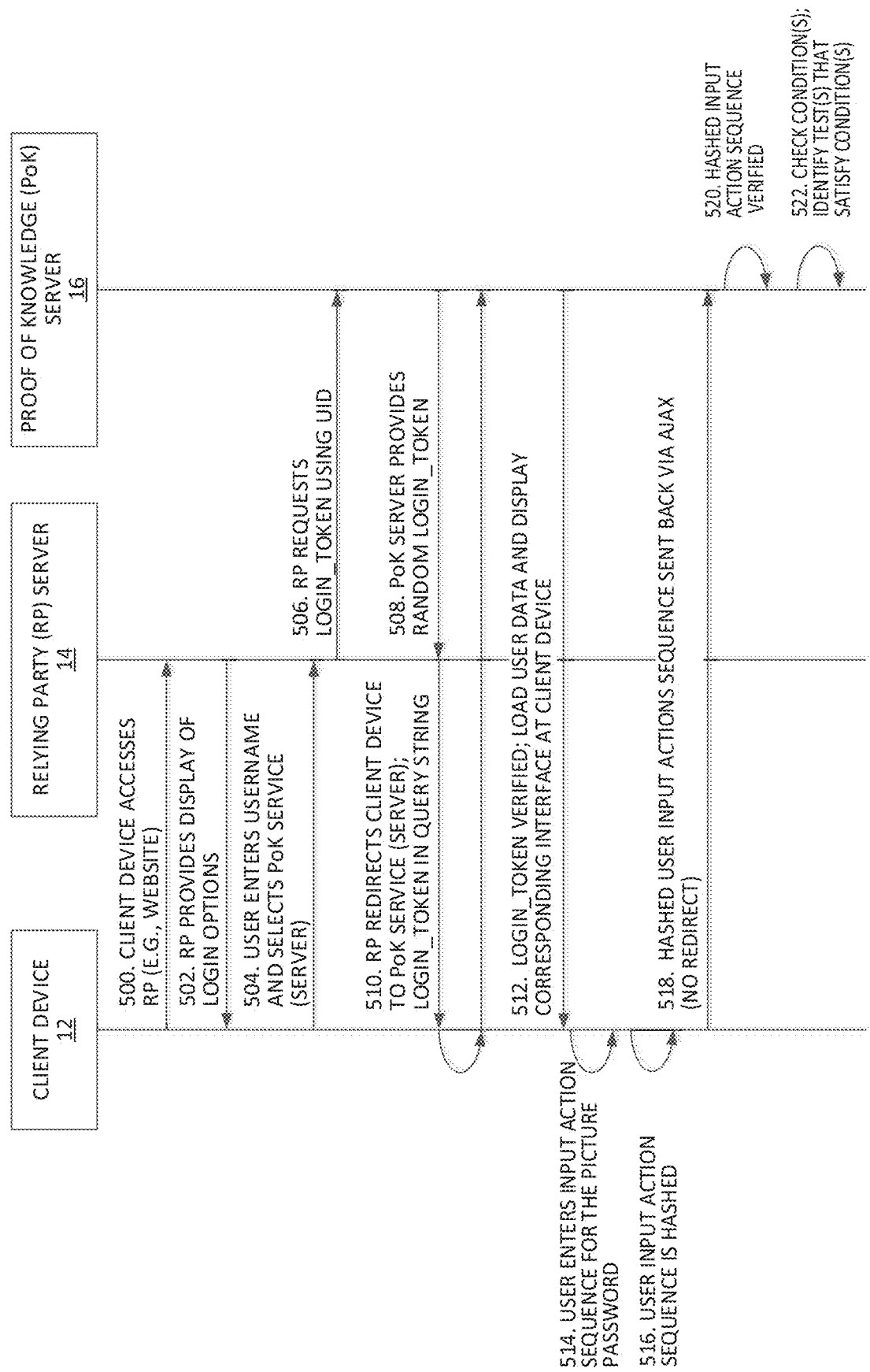
FIGS. 6A and 6B illustrate the operation of the advanced proof of knowledge authentication system of FIG. 1 during use of the advanced capability testing provisioned in FIGS. 5A and 5B according to some embodiments of the present disclosure.
Figure 6B:
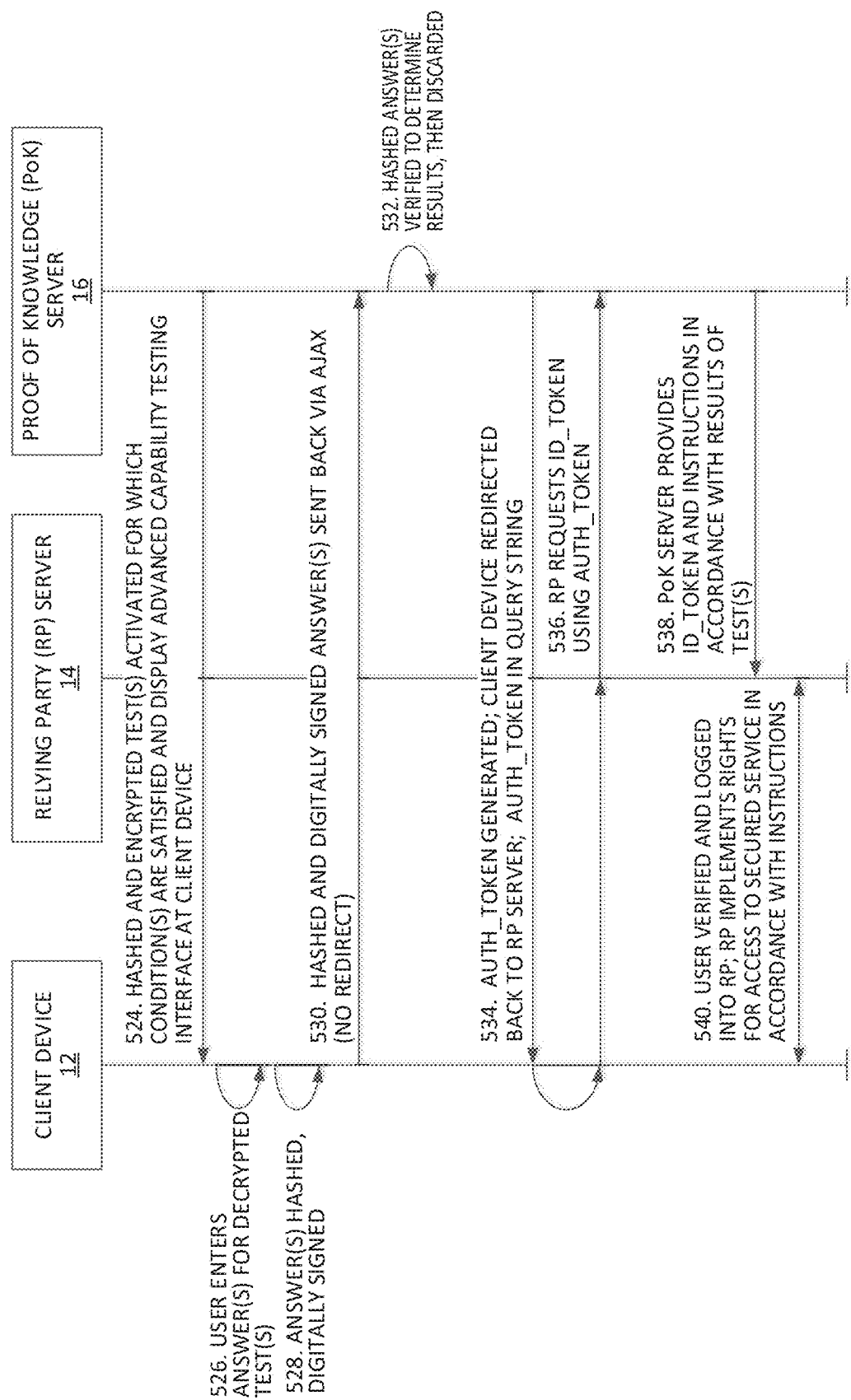

FIGS. 6A and 6B are a diagram that illustrates a process for utilizing the advanced capability testing provisioned in FIGS. 5A and 5B according to the first embodiment of the present disclosure. As shown, a user operating the client device 12 communicates with the RP server 14 to request access to one or more secured services administered by the RP server 14 (step 500). The one or more services may include providing access to private information such as financial information available via a website, but are not limited thereto. In response the RP server 14 provides a display of login options (step 502). The user can then enter a username and select the PoK service to authenticate the user (step 504). The RP server 14 then requests a login_token from the PoK server 16 using the UID (step 506). The PoK server 16 then returns a random login_token that is communicated in a query string via the RP server 14 to the client device 12 to redirect the client device 12 to the PoK server 16 (steps 508, 510).

Upon verifying the random login_token, the PoK server 16 loads the data associated with the user including an image for a picture password and provides an interface for display at the client device 12 (step 512). The user then enters a sequence of input actions for a displayed image of a picture password (step 514). The input action sequence is hashed and sent back to the PoK server 16 via AJAX with no redirect to the RP server 14 (steps 516, 518).

Upon verifying the hashed input action sequence to authenticate the user, the PoK server 16 checks the one or more conditions to identify tests that satisfy those conditions (steps 520, 522). Tests that satisfy the one or more conditions are activated and those that do not are deactivated. A corresponding interface for conducting the activated test(s) is provided by the PoK server 16 for display at the client device 12 (step 524). As such, the test(s) are administered by the PoK server 16. In some embodiments, the tests provided by the PoK server 16 to the client device 12 are hashed and encrypted as provisioned. As such, the encrypted tests are decrypted at the client device 12 to test the user.

The user operating the client device 12 then enters an answer(s) for the activated test(s) (step 526). The answers are hashed, digitally signed, and sent back to the PoK server 16 without a redirect to the RP server 14 (steps 528, 530). The hashed answers are verified at the PoK server 16 to determine the results of the testing, and may be discarded (step 532). Then the PoK server 16 generates an auth_token that is communicated in a query string to the client device 12 to redirect the client device 12 back to the RP server 14 (step 534). The RP server 14 then requests an id_token from the PoK server 16 by using the auth_token (step 536). The PoK server 16 then provides the id_token to the RP server 14 as well as one or more instructions determined based on results of the tests (step 538). Lastly, the RP server 14 verifies the user and logs the user in to grant access to the one or more services administered by the RP server 14 (step 540). The access rights to the one or more services is provided in accordance with instructions for access control (e.g., advance directives predefined by the user) that define actions that designate the level of access granted to the user for a particular service (e.g., controls access to secured private information).

Accordingly, the first embodiment provisions advanced capability testing directly on the proof of knowledge service provider's webpages. So, for example, if that webpage will take a picture password as proof knowledge of a password, then a person can also be given the option of being tested, under advanced capability testing for other things and appropriate actions are taken by the RP server 14 if the user fails those tests. In some embodiments, an agent of the person such as, for example, the person's attorney with an appropriate power of attorney could be given access to directly update the person's record at the PoK server 16. In some embodiments, this can only be done by the RP server 14 after it has asked the PoK server 16 to perform a proof of knowledge test on the user's identity (i.e., after authenticating a user) since only the RP server 14 has a non-spoofable digital identification for the person. The PoK server 16, which is a different agent than the RP server 14, could also operate as a text password checker where the RP server 14, again, does not know the text password or its hash, and the PoK server 16 does not know the identity of the person.

FIG. 7 is a diagram that illustrates a process for provisioning advanced capability testing at a RP server 14 according to a second embodiment of the present disclosure. As shown, a user operating the client device 12 communicates with the RP server 14 to request the setup of advanced capability testing for use to access services provided by the RP server 14 (step 600). In response, the RP server 14 provides an interface for display at the client device 12 for the user to create or select one or more tests for advanced capability testing. Accordingly, the user defines the tests at the RP server 14 (step 602). In some embodiments the tests are encrypted using a public key and are hashed.

The user also specifies one or more conditions under which the one or more tests activate when the conditions are satisfied and associates one or more instructions with results for passing or failing one or more of the tests (step 604). Accordingly, the one or more conditions may be predetermined or predefined by the user. The conditions may include, always activated, activated on request, activated for specific dates or time ranges, and activated based on an event trigger (e.g., after a specified number of logins in a given time). In some embodiments, the condition of always activated is the default condition, and the one or more tests are deactivated based on whether the one or more conditions are satisfied. Moreover, the instructions define one or more actions to be taken by the RP server 14 in the event that the user subsequently passes or fails one or more of the tests defined by the user. The actions may include providing read-only access, full access, restricted access, or the like The RP server 14 may then store hashes of the tests, instructions, and/or conditions with the UID record for the user (step 606). The user of the client device 12 enters and stores one or more answers for the one or more tests and confirms the answers by repeating the input (steps 608, 610). The client device 12 then hashes the answers, and communicates the hashed answers to the RP sever 14 (steps 612, 614). Lastly, the RP server 14 stores the hashed answers in the UID record for the user (step 616).

In some embodiments, the one or more of the tests, instructions, conditions, and/or answers are stored in a file or document as encrypted and/or unencrypted (i.e., clear text) data. For example, the conditions may be stored as unencrypted data that can be processed by the RP server 14 while the tests, instructions, and answers are stored as encrypted data that can be processed by the PoK server 16 but not processed by the RP server 14. Utilizing such a document maintains the isolation of some information from the PoK server 16 and other information from the RP server 14.

FIGS. 8A and 8B illustrate a call flow diagram for utilizing the advanced capability testing provisioned in FIG. 7 according to the second embodiment of the present disclosure. As shown, a user operating the client device 12 communicates with the RP server 14 to request access to one or more secured services administered by the RP server 14 (step 700). The one or more services may include access to private information such as financial information available via a website. In response, the RP server 14 provides a display of login options (step 702). The user can then enter a username and select the PoK service to authenticate the user (step 704).

The RP server 14 checks the one or more conditions to identify tests that satisfy those conditions (step 706). The RP server 14 then requests a login_token from the PoK server 16 using the UID, and provides hashed test(s) (and hashed answers) that satisfy the one or more conditions (step 708). The PoK server 16 then returns a random login_token that is communicated in a query string via the RP server 14 to the client device 12 to redirect the client device 12 to the PoK server 16 (steps 710, 712).

Upon verifying the random login_token, the PoK server 16 loads the data associated with the user including an image for a picture password and related input actions and provides an interface for display at the client device 12 (step 714). The user then enters a sequence of input actions for a displayed image of a picture password at the client device 12 (step 716). The input action sequence is hashed and sent back to the PoK server 16 via AJAX with no redirect to the RP server 14 (steps 718, 720).

Upon verifying the hashed input action sequence to authenticate the user (step 722), the PoK server 16 sends the hashed and encrypted tests (for which the conditions were satisfied) and provides a display of a corresponding interface at the client device 12 (step 724). The hashed tests are then decrypted at the client device 12 for the user to enter one or more answers for the decrypted tests (steps 726, 728). The answers are hashed and sent back to the PoK server 16 without a redirect to the RP server 14 (step 730, 732).

The hashed answers are verified at the PoK server 16 to determine the results of the testing (step 734). Then the PoK server 16 generates an auth_token that is communicated in a query string to the client device 12 to redirect the client device 12 back to the RP server 14 (step 736). The RP server 14 then requests an id_token from the PoK server 16 by using the auth_token (step 738). The PoK server 16 then provides the id_token to the RP server 14. In some embodiments, the PoK server 16 also provides one or more instructions determined based on results of the tests (step 740). In other embodiments, the RP server 14 knows the instructions that correspond with the tests originally sent to the PoK server 16 and acts accordingly in response to the tokens received from the PoK server 16. Lastly, the RP server 14 verifies the user and logs the user in to grant access to the one or more services administered by the RP server 14 (step 742). The access to the one or more services is provided in accordance with instructions (e.g., advance directives predefined by the user) that define actions that designate the level of access granted to the user for a particular service (e.g., controls access to secured private information).

Accordingly, the second embodiment provisions advanced capability testing at the RP server 14 by creating a digital document using public key cryptography to hide content. In some embodiments, this digital document could be provided to the RP server 14 to simply pass along to the PoK server 16. In this way, the RP server 14 can know that one or more instructions have been forwarded to the PoK server 16 without the RP server 14 knowing the content of the instructions. However, some limited information could be allowed to the RP server 14 in this otherwise encrypted document. For example, the RP server 14 can be informed of the various types of communications back that may be allowed (e.g., read-only, no transfers except to others with appropriate power of attorney, etc.). The RP server 14 may be told in the unencrypted (i.e., "clear text") part of the document that the person is being also asked to report back if the person cannot (technically) follow some of the instructions so that the person may notice a failure to allow access even though the person thought that the person was going to be given read access, and the like.

FIG. 9 is a diagram that illustrates a process for provisioning advanced capability testing according to a third embodiment of the present disclosure. In this embodiment, the user does not predefine or predetermine answers to the tests or the tests themselves. Instead, the user predetermines conditions for activating the tests, and predefines the instructions for access control for the results of the advanced capability testing. As shown, a user communicates with the RP server 14 to request to setup advanced capability testing for use to access services provided by the RP server 14 (step 800). In response, the RP server 14 requests an adv_cap_token from the PoK server 16 by using the UID (step 802). The PoK server 16 provides a random adv_cap_token to the RP server 14, which is used to redirect the client device 12 to the PoK server 16 by communicating the random adv_cap_token in a query string to the client device 12 (steps 804, 806).

The client device 12 verifies the random adv_cap_token (step 808). Then the PoK server 16 provides an interface for display at the client device 12 that includes options for conditions and instructions that provide access control based on the results of the advanced capability testing (step 810).

The user operating the client device 12 then selects one or more conditions and instructions for access control based on the result of the advanced capability testing (step 812). The specified conditions and instructions for the results of the advanced capability testing are sent to the PoK server 16 (step 814). Accordingly, the user predetermines the conditions and instructions at the PoK server 16. The conditions may include, for example, always activated, activated on request, activated for specific dates or time ranges, and activated based on an event trigger (e.g., after a specified number of logins in a given time). In some embodiments, the condition of "always activated" is the default condition, and the one or more tests are deactivated based on whether the one or more conditions are not satisfied. The instructions for access control define one or more actions to be taken by the RP server 14 in the event that the user subsequently passes or fails one or more of the tests defined by the user. The actions may include, for example, providing read-only access, full access, restricted access, or the like. Lastly, the PoK server 16 stores the conditions and instructions in association with the UID record for the user (step 816).

FIGS. 10A and 10B is a call flow diagram for utilizing the advanced capability testing provisioned in FIG. 9 according to the third embodiment of the present disclosure. As shown, a user operating the client device 12 communicates with the RP server 14 to request access to one or more secured services administered by the RP server 14 (step 900). In response the RP server 14 provides a display of login options (step 902). The user can then enter a username and select the PoK service to authenticate the user (step 904). The RP server 14 then requests a login_token from the PoK server 16 using the UID (step 906). The PoK server 16 then returns a random login_token that is communicated in a query string via the RP server 14 to the client device 12 to redirect the client device 12 to the PoK server 16 (steps 908, 910).

Upon verifying the random login_token, the PoK server 16 loads the data associated with the user including an image for a picture password and related input actions (step 912).

The user then enters a sequence of input actions for a displayed image of a picture password, which is then hashed (step 914). The hashed input action sequence is sent to the PoK server 16 via AJAX with no redirect to the RP server 14 (step 916).

Upon verifying the hashed input action sequence to authenticate the user, the PoK server 16 checks the one or more conditions to identify tests that satisfy those conditions (steps 918, 920). Tests that satisfy the one or more conditions are activated and those that do not are deactivated. In some embodiments, the tests are chosen by the PoK server 16 from a catalog of tests according to a random or pseudo random process (step 922).

The activated test(s) are provided by the PoK server 16 for display at the client device 12 (step 924). As such, the test(s) are administered by the PoK server 16. The user operating the client device 12 then enters an answer(s) for the activated test(s) (step 926). The answer(s) are hashed, digitally signed, and sent to the PoK server 16 via AJAX without a redirect to the RP server 14 (steps 928, 930). The hashed answers are verified at the PoK server 16 to determine the results of the testing, and then discarded (step 932). The results of the advanced capability testing are then used to determine one or more instructions (e.g., advance directives predefined by the user) for access control (step 934).

Then the PoK server 16 generates an auth_token that is communicated in a query string to the client device 12 to redirect the client device 12 back to the RP server 14 (step 936). The RP server 14 then requests an id_token from the PoK server 16 by using the auth_token (step 938). The PoK server 16 then provides the id_token to the RP server 14 as well as one or more instructions determined based on results of the tests (step 940). Lastly, the RP server 14 verifies the user and logs the user in to grant access to the one or more services administered by the RP server 14 (step 942). The access to the one or more services is provided in accordance with instructions that define actions to designate the level of access granted to the user for a particular service (e.g., controls access to secured private information).

Figure 11:
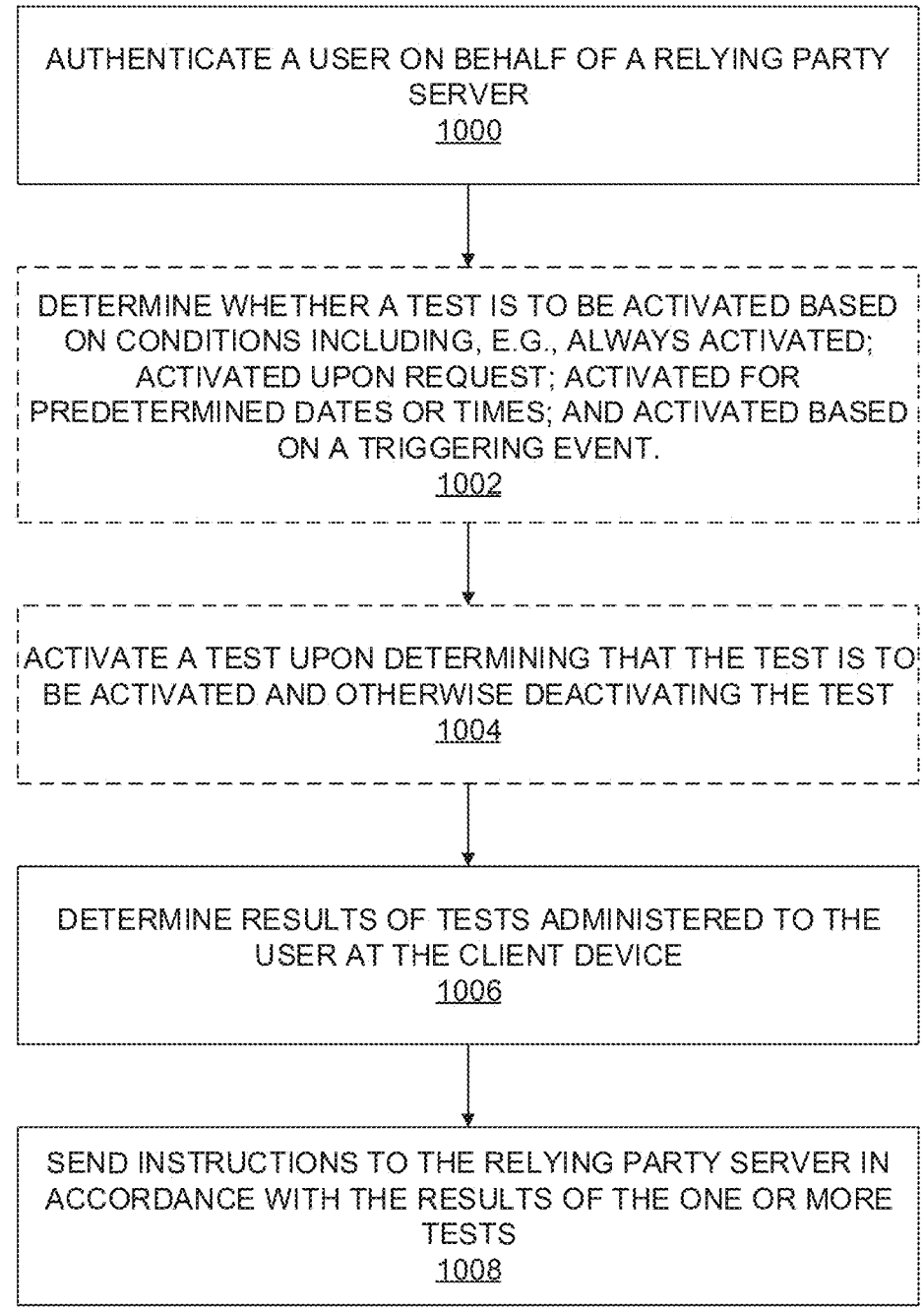
FIG. 11 is a flowchart illustrating a method of operation of a proof of knowledge server according to some embodiments of the present disclosure.
Figure 12:
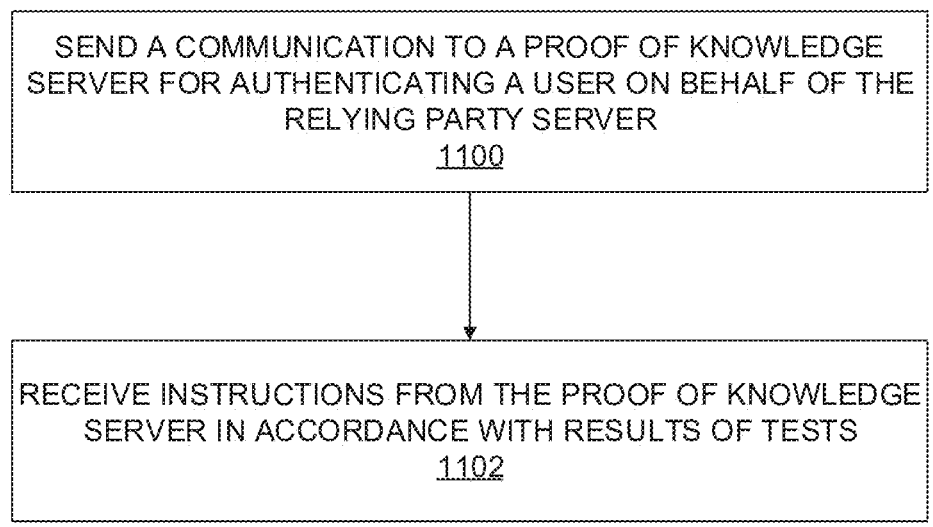
FIG. 12 is a flowchart illustrating a method of operation of a relying party server according to some embodiments of the present disclosure.
Figure 13:
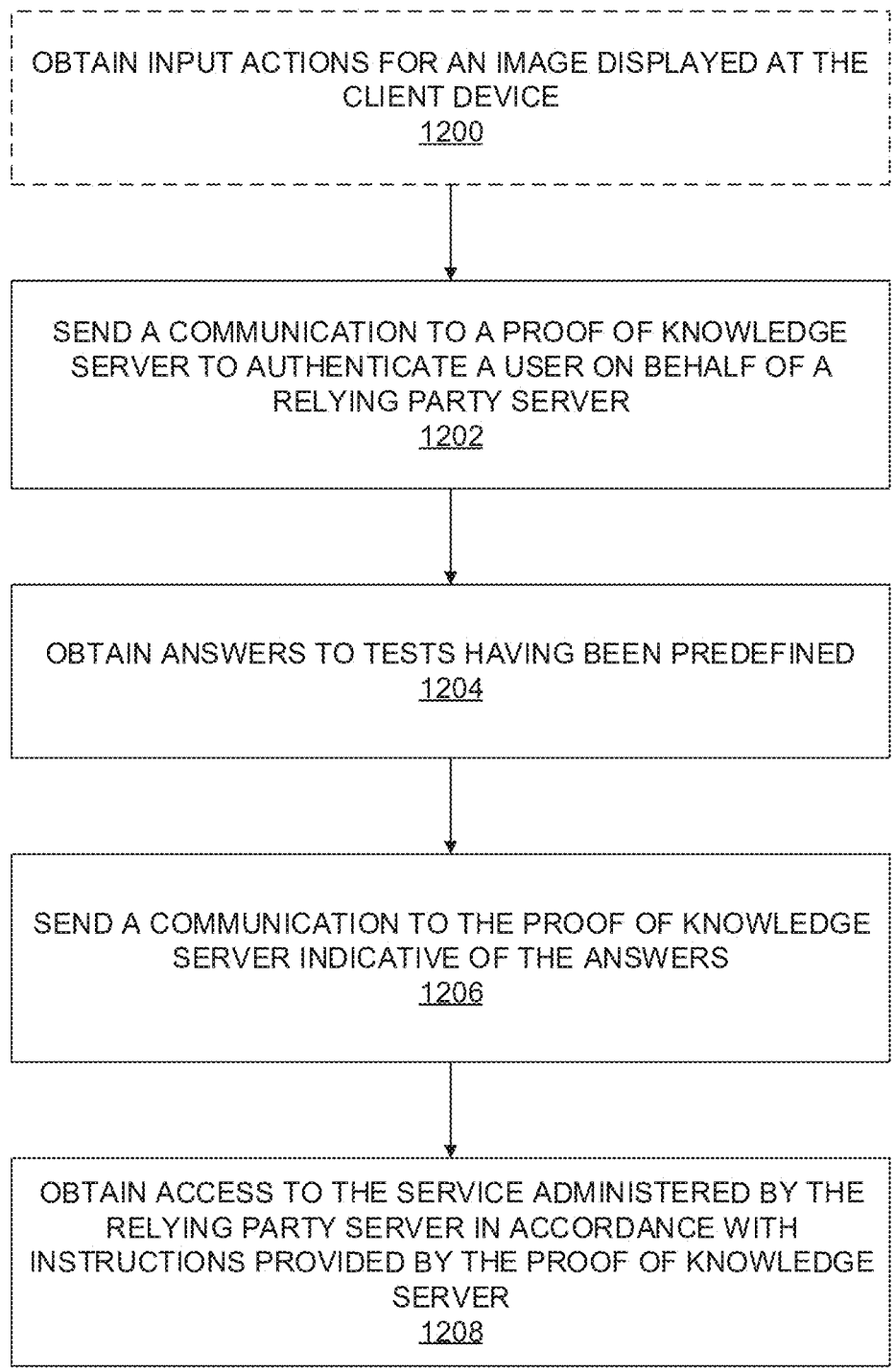
FIG. 13 is a flowchart illustrating a method of operation of a client device according to some embodiments of the present disclosure.

FIGS. 11 through 13 are flowcharts that show methods of operation of the PoK server 16, the RP server 14, and the client device 12 of the advanced proof of knowledge authentication system 10 discussed above, according to some embodiments of the present disclosure.

For example, FIG. 11 is a flowchart illustrating a method of operation of the PoK server 16 to provide a PoK service according to some embodiments of the present disclosure. Embodiments include authenticating a user on behalf of the RP server 14 (step 1000). The PoK server 16 may determine whether one or more conditions for activating a test are satisfied (step 1002), and activate a test upon determining that the one or more conditions are satisfied (step 1004). In some embodiments, each test belongs to a set of tests that are activated by default and otherwise deactivated when conditions are not satisfied. In some embodiments, the conditions are predetermined by the user and may include always activated, activated upon request, activated for predetermined dates or times, or activated based on a triggering event.

The method of operation of the PoK server 16 includes obtaining instructions based on results of one or more answers to one or more tests from the client device 12 of the user (step 1006), and sending one or more instructions to the RP server 14 in accordance with the results of the one or more tests (step 1008). As such, the PoK server 16 does not know the test(s) or the answer(s) to the test(s). Instead, the PoK server 16 may only know if the user passed and/or failed the test(s). In some embodiments, the one or more tests and/or the one or more instructions have been predefined by the user. In some embodiments, the one or more tests are randomly or pseudo randomly selected by the PoK server 16 during administration of the advanced capability testing. Moreover, the one or more instructions define one or more actions to be taken by the RP server 14 in the event that the user does not pass the one or more tests based on the one or more answers.

FIG. 12 is a flowchart illustrating a method of operation of the RP server 14 to provide services to a user according to some embodiments of the present disclosure. Embodiments include sending a communication to the PoK server 16 for authenticating a user on behalf of the RP server 14 (step 1100), and receiving one or more instructions from the PoK server 16 in accordance with results of one or more answers to one or more tests (step 1102). In some embodiments, the one or more tests and/or the one or more instructions are predefined by the user. In some embodiments, the one or more tests are randomly or pseudo randomly selected by the PoK server 16 during administration of the advanced capability testing. Moreover, the one or more instructions define one or more actions to be taken by the RP server 14 in the event that the user does not pass the one or more tests based on the one or more answers.

FIG. 13 is a flowchart illustrating a method of operation of the client device 12 according to some embodiments of the present disclosure. Embodiments include obtaining one or more input actions for an image displayed at the client device 12 (step 1200), and sending a communication to a PoK server 16 to authenticate a user on behalf of a RP server 14 based on the one more input actions (step 1202). The method also includes obtaining one or more answers to one or more tests having been predefined by the user (step 1204), and sending a communication to the PoK server 16 indicative of the one or more answers to determine access to a service administered by the RP server 14 (step 1206). The method further includes obtaining access to the service administered by the RP server 14 in accordance with one or more instructions provided by the PoK server 16 (step 1208). In some embodiments, the one or more tests and/or the one or more instructions are predefined by the user. In some embodiments, the one or more tests are randomly or pseudo randomly selected by the PoK server 16 during administration of the advanced capability testing. Moreover, the one or more instructions define one or more actions to be taken by the RP server 14 in the event that the user does not pass the one or more tests based on the one or more answers.

Figure 14:
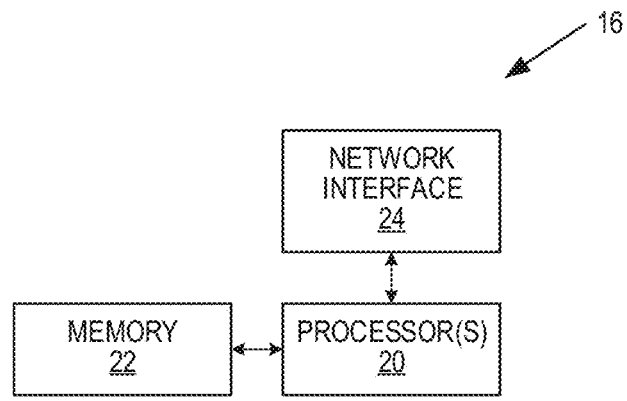
FIG. 14 is a block diagram of a server computer for providing a proof of knowledge service according to some embodiments of the present disclosure.

FIG. 14 is a block diagram of the PoK server 16 to provide a PoK service according to some embodiments of the present disclosure. As illustrated, the PoK server 16 includes one or more processors 20 such as, for example, one or more Central Processing Units (CPUs), Application Specific Integrated Circuits (ASICs), and/or Field Programmable Gate Arrays (FPGAs), memory 22, and a network interface 24. In some embodiments, the functionality of the PoK server 16 is implemented in software stored in the memory 22 for execution by the one or more processors 20. In some embodiments, the PoK server 16 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the PoK server 16 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 22).

Figure 15:
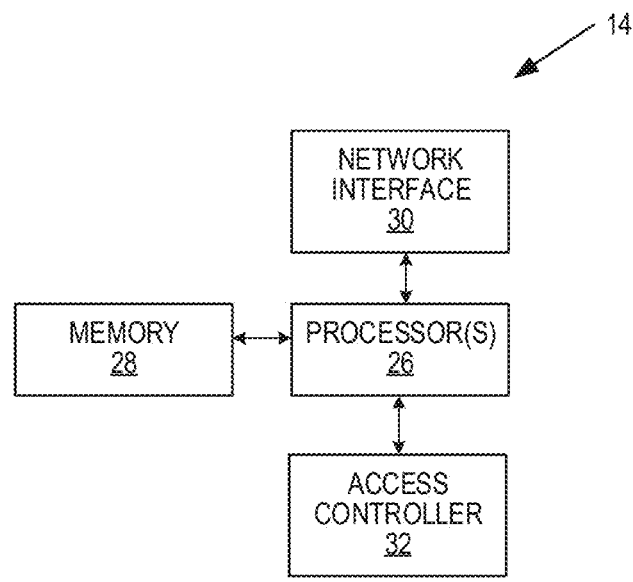
FIG. 15 is a block diagram of a relying party server according to some embodiments of the present disclosure.

FIG. 15 is a block diagram of the RP server 14 according to some embodiments of the present disclosure. As illustrated, the RP server 14 includes one or more processors 26 such as, for example, one or more CPUs, ASICs, and/or FPGAs, memory 28, and a network interface 30. The RP server 14 also includes an access controller 32 to control access to services administered by the RP server 14 in accordance with instructions. As illustrated, the access controller 32 may be embodied in, for example, one or more ASICs, FPGAs, or any combination of hardware and/or software components. In some embodiments, the functionality of the RP server 14 is implemented in software stored in the memory 28 for execution by the one or more processors 26. In some embodiments, the RP server 14 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the RP server 14 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

Figure 16:
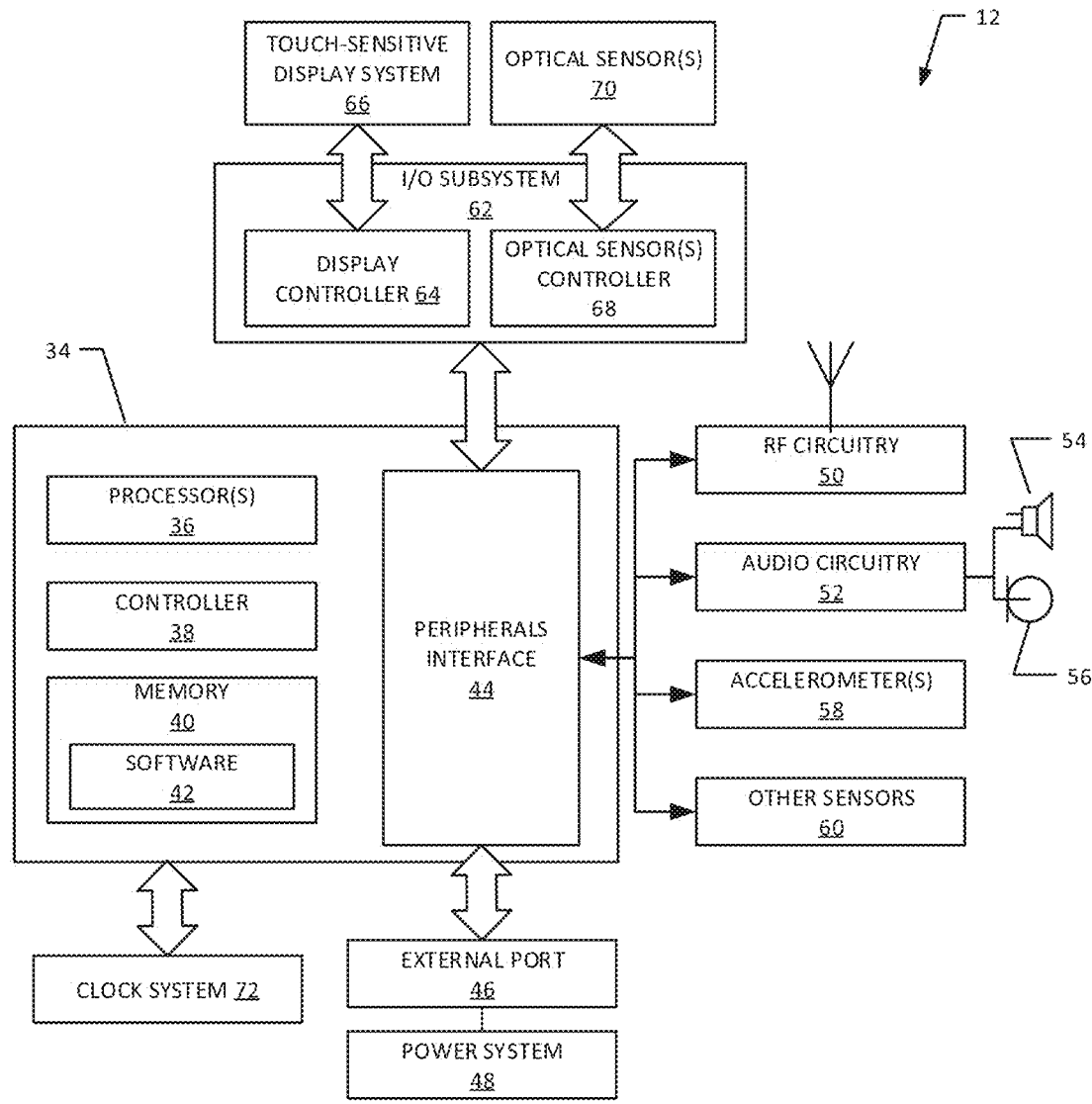
FIG. 16 is a block diagram of a client device according to some embodiments of the present disclosure.

FIG. 16 is a block diagram of the client device 12 according to some embodiments of the present disclosure. The client device 12 is shown as an electronic device with a touch-sensitive display (e.g., a smartphone or a tablet) but may be embodied as any other type of client device. As shown, the client device 12 includes a control or processing system 34 that includes one or more processors 36 (e.g., CPUs, ASICs, and/or FPGAs), a memory controller 38, memory 40 (which may include software 42 such as a browser software application), and a peripherals interface 44.

The peripherals interface 44 may communicate with an external port 46, which can provide access to a power system 48. Other components in communication with the peripherals interface 44 include Radio Frequency (RF) circuitry 50 (e.g., WiFi and/or cellular communications circuitry) and audio circuitry 52 for a speaker 54 and a microphone 56 of the client device 12. Other components in communication with the peripherals interface 44 include one or more accelerometers 58 and other sensors 60. The peripherals interface 44 may communicate with an Input/Output (I/O) subsystem 62, which includes a display controller 64 operable to control a touch-sensitive display system 66, which further includes the touch-sensitive display of the client device 12. The I/O subsystem 62 also includes an optical sensor(s) controller 68 for one or more optical sensors 70. Lastly, a clock system 72 controls a timer for use by the disclosed embodiments as detailed above.

Accordingly, FIG. 16 shows components of the client device 12 that enable a user to interface with features of the disclosed embodiments. The client device 12 may include other components not shown in FIG. 16, nor further discussed herein for the sake of brevity. A person skilled in the art will understand the additional hardware and software included but not shown in FIG. 16. For example, the I/O subsystem 62 may include other components (not shown) to control physical buttons.

In some embodiments, a computer program including instructions which, when executed by at least one processor, cause the at least one processor to carry out the functionality of the client device 12 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Those skilled in the art will recognize improvements and modifications to the preferred embodiments of the present disclosure. All such improvements and modifications are considered within the scope of the concepts disclosed herein and the claims that follow.

What is claimed is:

1. A server computer providing a proof of knowledge service, comprising:
   one or more processors; and
   memory containing instructions executable by the one or more processors whereby the server computer is operable to:
   authenticate a user login request from a client device on behalf of a relying party server;
   determine results of one or more tests administered to the user at the client device; and
   send one or more instructions to the relying party server in accordance with the results of the one or more tests, the one or more instructions having been predefined by the user and defining one or more actions to be taken by the relying party server in an event where the user does not pass the one or more tests;
   wherein the server computer obtains for the one or more tests a user selection of an access right from a group of access rights, the group consisting of: read-only access, full access and restricted access;
   wherein the server computer obtains for the one or more tests a user selection of a condition from a group of conditions, the group consisting of: always activated; activated upon request; activated for predetermined dates or times; and activated based on a triggering event.

2. The server computer of claim 1, wherein the one or more tests have been predefined by the user.

3. The server computer of claim 1, wherein the server computer is further operable to:
   obtain information indicative of whether one or more conditions from the group of conditions for activating the one or more tests are satisfied, the one or more conditions having been predetermined by the user; and
   administer the one or more tests upon determining that the one or more conditions are satisfied.

4. The server computer of claim 1, wherein, for each of a set of tests, the server computer is further operable to:
   obtain information indicative of whether the test is to be activated based on one or more conditions from the group of conditions having been predetermined by the user; and
   administer the test upon determining that the test is to be activated and otherwise deactivating the test, wherein the one or more tests for which the results are obtained are one or more tests from the set of tests that are activated.

5. The server computer of claim 1, wherein the one or more instructions set rights for the user at the client device to access a service provided by the relying party server in accordance with one of read-only access, full access, and restricted access.

6. The server computer of claim 1, wherein, in order to send the one or more instructions to the relying party server in accordance with the results of the one or more tests, the server computer is further operable to:
   determine whether the user passed the one or more tests based on input obtained from the client device; and
   upon determining that the user did not pass the one or more tests, send the one or more instructions to the relying party server.

7. The server computer of claim 6, wherein the results of the one or more tests are indicative of a mental capacity of the user.

8. The server computer of claim 7, wherein the one or more actions defined by the one or more instructions comprise restricting access to services provided by the relying party server.

9. The server computer of claim 1, wherein, for each of the one or more tests, the server computer is further operable to:
   determine whether one or more conditions from the group of conditions for activating the test are satisfied; and
   activate the test upon determining that the one or more conditions are satisfied and otherwise deactivating the test.

10. The server computer of claim 1, wherein the server computer is further operable to:
    receive a communication from the client device of the user which authorizes another user to modify at least one of the one or more tests and at least one of the one or more instructions.

11. The server computer of claim 1, wherein the server computer is further operable to:
    receive a communication from the relying party server, the communication comprising encrypted data indicative of the one or more tests.

12. A relying party server, comprising:
    one or more processors; and
    memory containing instructions executable by the one or more processors whereby the relying party server is operable to:
    send a communication to a proof of knowledge server for authenticating a user login request on behalf of the relying party server;
    obtain for the one or more tests a user selection of an access right from a group of access rights, the group consisting of: read-only access, full access and restricted access;
    obtain for the one or more tests a user selection of a condition from a group of conditions, the group consisting of: always activated; activated upon request; activated for predetermined dates or times; and activated based on a triggering event;
    obtain one or more answers to one or more tests;
    send a communication to the proof of knowledge server indicative of the one or more answers; and
    receive one or more instructions from the proof of knowledge server, to obtain access to a service administered by the relying party server, in accordance with results of one or more tests, the one or more instructions having been predefined by the user and defining one or more actions to be taken by the relying party server in an event where the user does not pass the one or more tests as determined based on the one or more answers.

13. The relying party server of claim 12, wherein the one or more actions defined by the one or more instructions restrict access to services provided by the relying party server.

14. The relying party server of claim 12, wherein the one or more tests are unknown to the relying party server.

15. The relying party server of claim 12, wherein, for each of a set of tests, the relying party server is further operable to:
determine whether the test is to be activated based on one or more conditions having been predetermined by the user; and
activate the test upon determining that the test is to be activated and otherwise deactivating the test, wherein the one or more tests for which the results are obtained are one or more tests from the set of tests that are activated.

16. A client device comprising:
one or more processors; and
memory containing instructions executable by the one or more processors whereby the client device is operable to:
send a communication to a proof of knowledge server to authenticate a user login request on behalf of a relying party server;
obtain for the one or more tests a user selection of an access right from a group of access rights, the group consisting of: read-only access, full access and restricted access;
obtain for the one or more tests a user selection of a condition from a group of conditions, the group consisting of: always activated; activated upon request; activated for predetermined dates or times; and activated based on a triggering event;
obtain one or more answers to one or more tests;
send a communication to the proof of knowledge server indicative of the one or more answers; and
obtain access to a service administered by the relying party server in accordance with one or more instructions provided by the proof of knowledge server, the one or more instructions having been predefined by the user and defining one or more actions to be taken by the relying party server in an event where the user does not pass the one or more tests as determined based on the one or more answers.

17. The client device of claim 16, wherein the one or more tests have been predefined by the user.

18. The client device of claim 16, wherein the client device is further operable to:
access an interface administered by the relying party server for display at the client device;
send a request to the relying party server to authenticate the user login request;
receive a communication from the proof of knowledge server that causes the client device to redirect communications from the relying party server to the proof of knowledge server;
receive a communication from the proof of knowledge sever to enable user input of a proof of knowledge for user authentication; and
obtain user input of the proof of knowledge;
where the communication sent to the proof of knowledge server to authenticate the user login request on behalf of the relying party server comprises information that is indicative of the user input of the proof of knowledge.

19. The client device of claim 16, wherein, upon sending the communication to the proof of knowledge server indicative of the one or more answers, the client device is further operable to:
receive a communication from the proof of knowledge server that causes the client device to redirect communications from the proof of knowledge server to the relying party server.

* * * * *